United States Patent
Heirman et al.

(10) Patent No.: US 10,394,678 B2
(45) Date of Patent: Aug. 27, 2019

(54) WAIT AND POLL INSTRUCTIONS FOR MONITORING A PLURALITY OF ADDRESSES

(71) Applicant: Intel Corporation, Santa Clara, CA (US)

(72) Inventors: Wim Heirman, Ghent (BE); Yves Vandriessche, Kontich (BE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/394,432

(22) Filed: Dec. 29, 2016

(65) Prior Publication Data
US 2018/0189060 A1    Jul. 5, 2018

Related U.S. Application Data

(63) Continuation of application No. 15/394,271, filed on Dec. 29, 2016.

(51) Int. Cl.
| G06F 9/30 | (2018.01) |
| G06F 9/38 | (2018.01) |
| G06F 9/52 | (2006.01) |
| G06F 11/30 | (2006.01) |
| G06F 1/3228 | (2019.01) |
| G06F 12/084 | (2016.01) |

(Continued)

(52) U.S. Cl.
CPC ........ *G06F 11/3037* (2013.01); *G06F 1/3228* (2013.01); *G06F 9/3016* (2013.01); *G06F 9/3818* (2013.01); *G06F 9/52* (2013.01); *G06F 11/3055* (2013.01); *G06F 12/084* (2013.01); *G06F 12/0831* (2013.01); *G06F 12/0842* (2013.01); *G06F 12/0804* (2013.01); *G06F 12/0808* (2013.01); *G06F 2201/885* (2013.01); *G06F 2212/1024* (2013.01); *G06F 2212/1028* (2013.01)

(58) Field of Classification Search
CPC ............................ G06F 9/3016; G06F 1/3228
See application file for complete search history.

(56) References Cited

U.S. PATENT DOCUMENTS

| 5,623,628 A | 4/1997 | Brayton et al. |
| 5,890,200 A | 3/1999 | Merchant |

(Continued)

OTHER PUBLICATIONS

Data Structure—Queue, Nov. 11, 2015, 6 pages, [retrieved from the internet on Dec. 19, 2017], retrieved from URL <www.tutorialspoint.com/data_structures_algorithms/dsa_queue.htm>.*

(Continued)

*Primary Examiner* — Jyoti Mehta
(74) *Attorney, Agent, or Firm* — Nicholson De Vos Webster & Elliott LLP

(57) ABSTRACT

A processor core includes a decode circuit to decode an instruction. The processor core further includes a monitor circuit, where the monitor circuit includes a data structure to store a plurality of entries for addresses that are being monitored by the monitor circuit and a triggered queue to store a plurality of addresses for which a triggering event occurred. The processor core further includes an execution circuit to execute the decoded instruction to dequeue an address from the triggered queue and return the dequeued address in response to a determination that the triggered queue is not empty.

15 Claims, 29 Drawing Sheets

(51) Int. Cl.
   *G06F 12/0804* (2016.01)
   *G06F 12/0808* (2016.01)
   *G06F 12/0831* (2016.01)
   *G06F 12/0842* (2016.01)

(56) References Cited

U.S. PATENT DOCUMENTS

| | | | |
|---|---|---|---|
| 6,076,129 | A | 6/2000 | Fenwick et al. |
| 6,996,645 | B1 | 2/2006 | Wiedenman et al. |
| 7,257,679 | B2 | 8/2007 | Clark |
| 2003/0126379 | A1 | 7/2003 | Kaushik et al. |
| 2004/0073905 | A1 | 4/2004 | Emer et al. |
| 2006/0075060 | A1* | 4/2006 | Clark ............... G06F 9/3004 709/213 |
| 2007/0088916 | A1 | 4/2007 | Jacobson et al. |
| 2009/0150649 | A1* | 6/2009 | Abella ............ G06F 9/30141 712/4 |
| 2009/0172284 | A1 | 7/2009 | Offen et al. |
| 2010/0077143 | A1* | 3/2010 | Reid ............... G06F 11/348 711/118 |
| 2011/0154079 | A1 | 6/2011 | Dixon et al. |
| 2014/0075163 | A1* | 3/2014 | Loewenstein ....... G06F 9/30043 712/225 |
| 2014/0215157 | A1* | 7/2014 | Moir ................ G06F 12/0811 711/122 |
| 2014/0250312 | A1 | 9/2014 | Reinhardt et al. |
| 2015/0378902 | A1 | 12/2015 | Gschwind et al. |

OTHER PUBLICATIONS

Linked Lists, Apr. 23, 2012, 10 pages, [retrieved from the internet on Dec. 20, 2017], retrieved from URL <www.cs.cmu.edu/~adamchik/15-121/lectures/Linked%20Lists/linked%20lists.html>.*

List data structure, Sep. 29, 2008, 19 pages, [retrieved from the internet on Dec. 20, 2017], retrieved from URL <https://www.slideshare.net/derlaz/list-data-structure-presentation>.*

Non-Final Office Action from U.S. Appl. No. 15/394,271, dated Apr. 9, 2018, 20 pages.

Notice of Allowance from U.S. Appl. No. 15/394,271, dated Jan. 3, 2019, 13 pages.

Extended European Search Report for Application No. 17205506.3, dated Sep. 13, 2018, 8 pages.

Final Office Action from U.S. Appl. No. 15/394,271, dated Oct. 4, 2018, 14 pages.

* cited by examiner

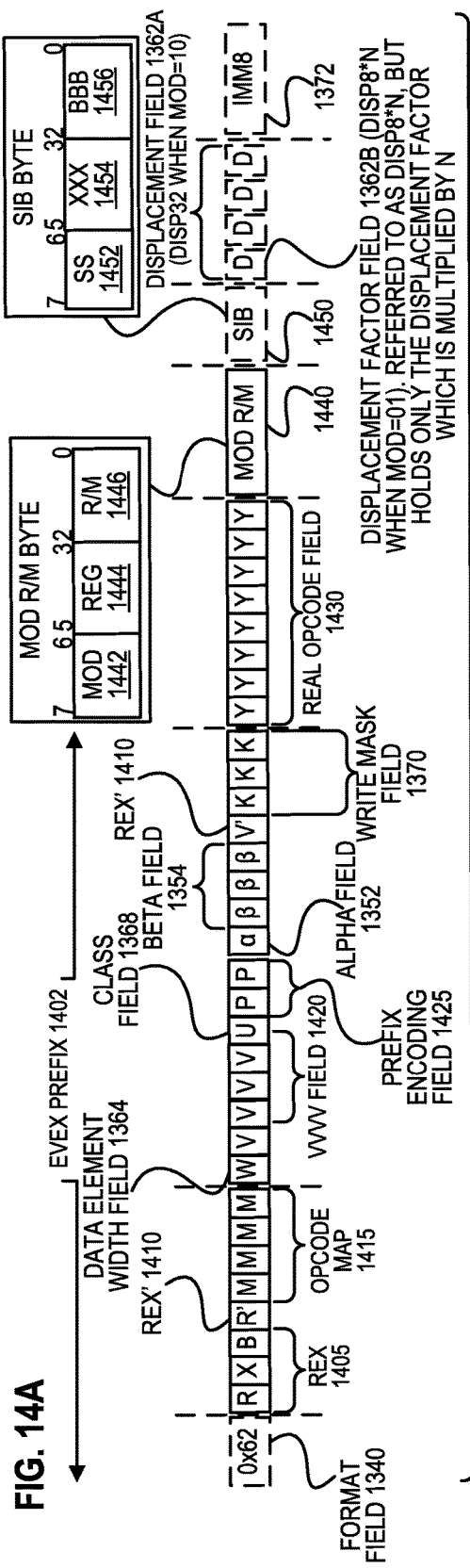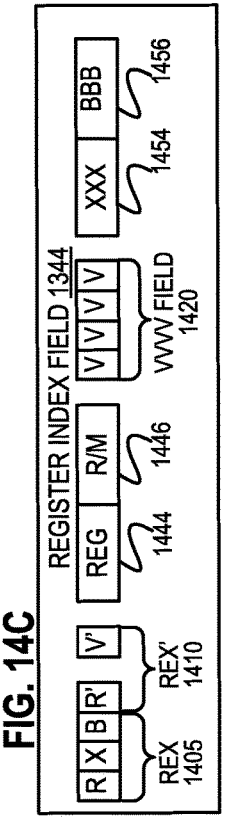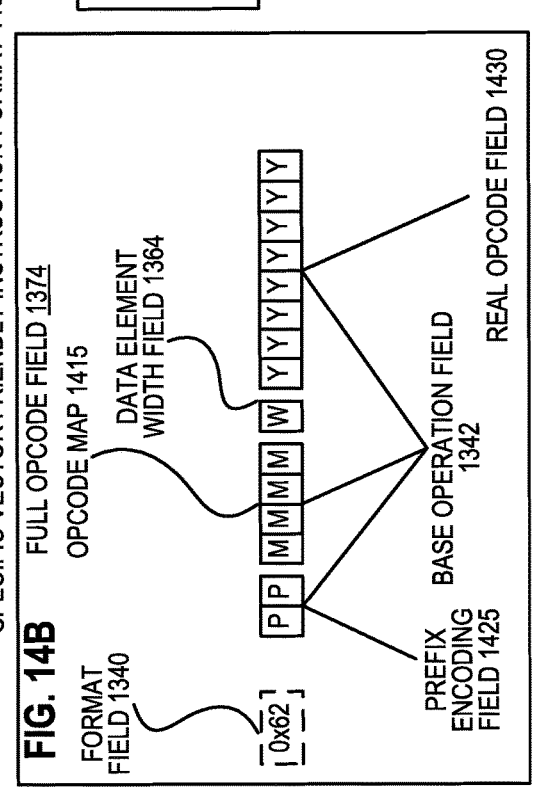
FIG. 14A
FIG. 14B
FIG. 14C

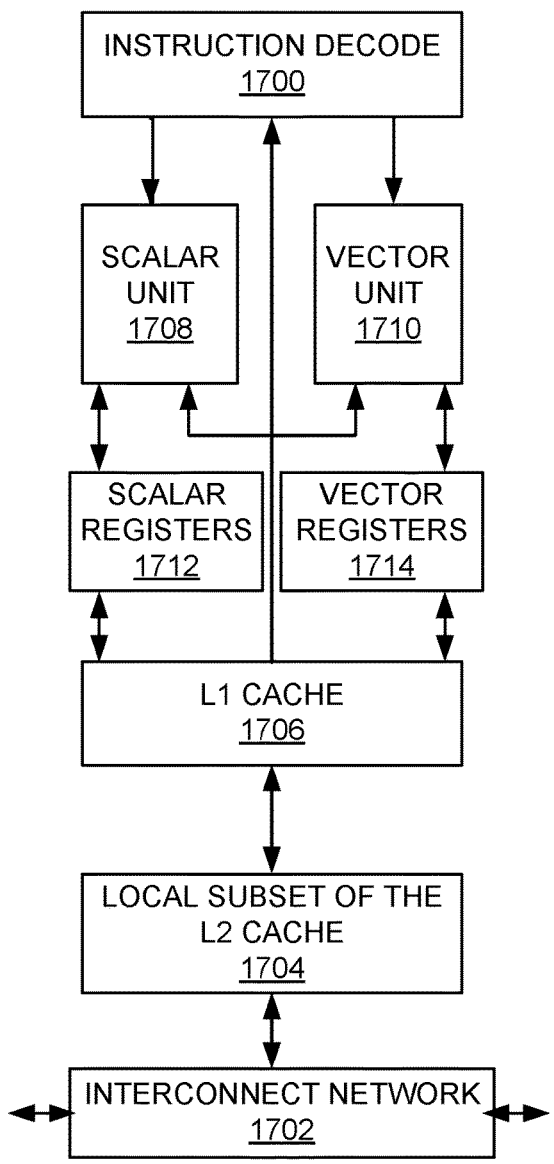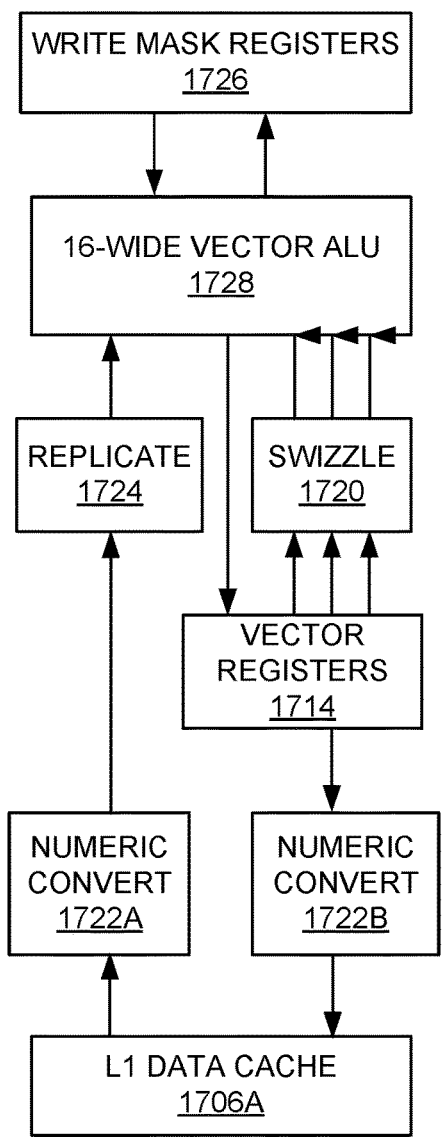

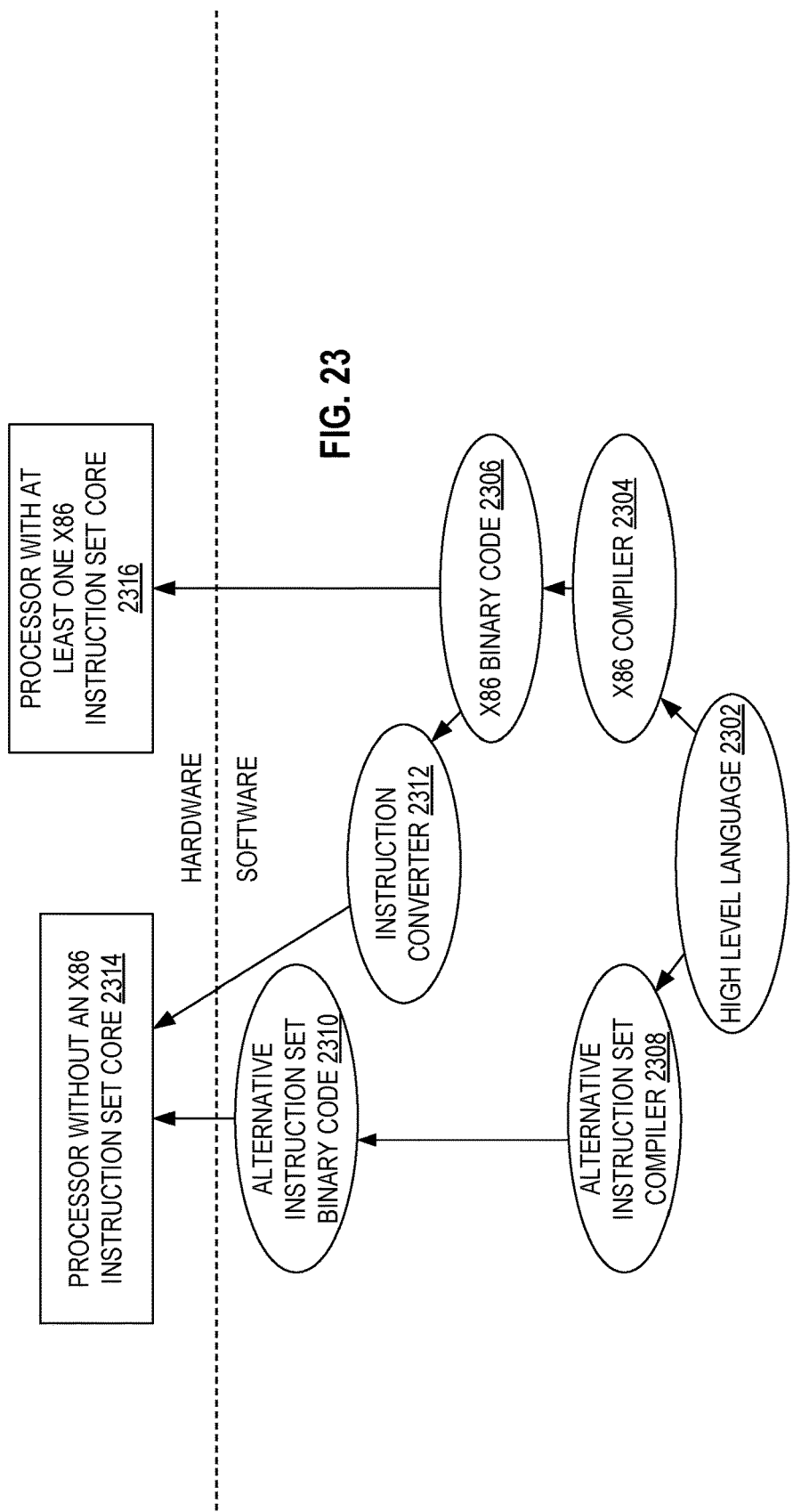

WAIT AND POLL INSTRUCTIONS FOR MONITORING A PLURALITY OF ADDRESSES

CROSS REFERENCE TO RELATED APPLICATIONS

This application is a continuation of application Ser. No. 15/394,271, filed Dec. 29, 2016, which is hereby incorporated by reference.

TECHNICAL FIELD

Embodiments of the invention relate to the field of computer instruction set architecture; and more specifically, to instructions for monitoring multiple addresses.

BACKGROUND

Many computing applications can benefit from the use of fine-grained parallelism to reduce load imbalance and to allow for more parallel operations. With fine-grained parallelism, an application is divided into a large number of small tasks and these tasks are assigned across multiple processors. However, the overhead of scheduling tasks and switching between tasks is typically too high for existing hardware to effectively exploit fine-grained parallelism.

One approach for implementing fine-grained parallelism is an approach that is implemented solely in software. This approach typically requires an active polling mechanism that periodically checks whether there is data that is ready for consumption. However, this approach typically incurs high overhead. Another approach for implementing fine-grained parallelism is to implement a full tasking system in hardware. However, this approach is inflexible with regard to usage pattern and the number of tasks it can support.

In modern high-performance processors, fine-grained parallelism can be achieved by synchronizing threads via shared memory. For example, a thread may register an address to be monitored and enter an optimized state (e.g., low-power mode) until data is written to that address. For this purpose, a processor's instruction set architecture may include instructions to monitor a specified address for write-to-memory activities. For example, a processor's instruction set architecture may include a MONITOR instruction and an MWAIT instruction. The MONITOR instruction allows software to specify an address range to monitor. The MWAIT instruction allows software to instruct the logical processor to enter an optimized state (which may vary depending on implementations) until a write operation to the address range specified by the MONITOR instruction occurs. The MONITOR/MWAIT instructions can thus be used to monitor a single address range.

BRIEF DESCRIPTION OF THE DRAWINGS

The invention may best be understood by referring to the following description and accompanying drawings that are used to illustrate embodiments of the invention. In the drawings:

FIG. 13A is a block diagram illustrating a generic vector friendly instruction format and class A instruction templates thereof according to embodiments of the invention;

FIG. 13B is a block diagram illustrating the generic vector friendly instruction format and class B instruction templates thereof according to embodiments of the invention;

FIG. 14A is a block diagram illustrating an exemplary specific vector friendly instruction format according to embodiments of the invention;

FIG. 14B is a block diagram illustrating the fields of the specific vector friendly instruction format 1400 that make up the full opcode field 1374 according to one embodiment of the invention;

FIG. 14C is a block diagram illustrating the fields of the specific vector friendly instruction format 1400 that make up the register index field 1344 according to one embodiment of the invention;

FIGS. 17A-B illustrate a block diagram of a more specific exemplary in-order core architecture, which core would be one of several logic blocks (including other cores of the same type and/or different types) in a chip;

FIG. 17A is a block diagram of a single processor core, along with its connection to the on-die interconnect network 1702 and with its local subset of the Level 2 (L2) cache 1704, according to embodiments of the invention;

FIG. 17B is an expanded view of part of the processor core in FIG. 17A according to embodiments of the invention;

FIG. 19 shown a block diagram of a system in accordance with one embodiment of the present invention;

FIG. 20 is a block diagram of a first more specific exemplary system in accordance with an embodiment of the present invention;

FIG. 21 is a block diagram of a second more specific exemplary system in accordance with an embodiment of the present invention;

FIG. 22 is a block diagram of a SoC in accordance with an embodiment of the present invention; and FIG. 23 is a block diagram contrasting the use of a software instruction converter to convert binary instructions in a source instruction set to binary instructions in a target instruction set according to embodiments of the invention.

DETAILED DESCRIPTION

Figure 1:
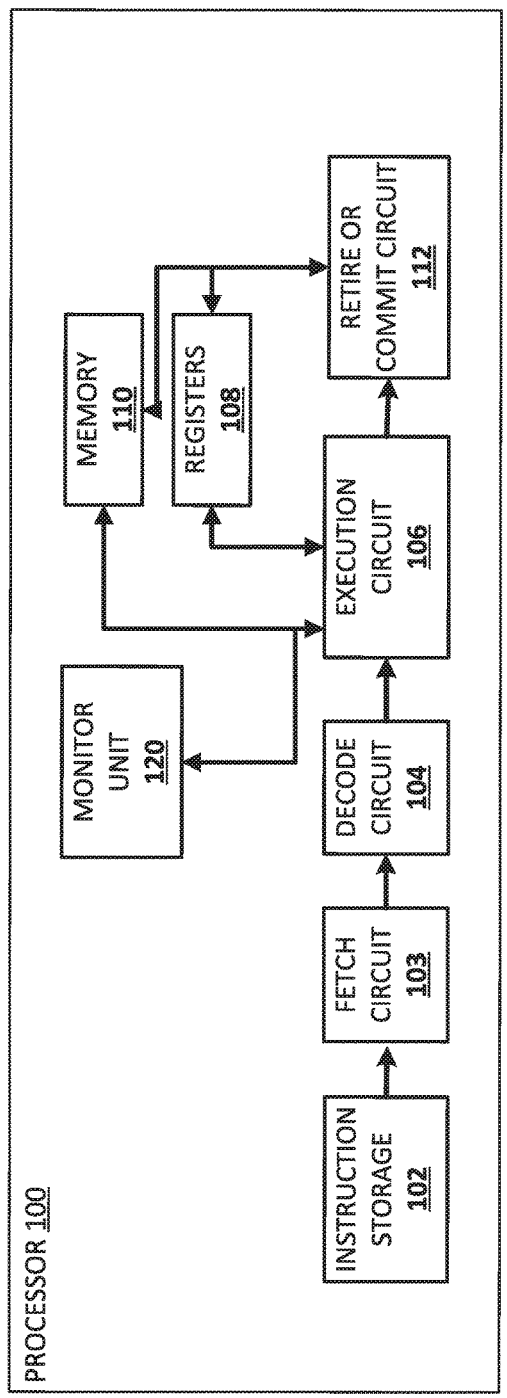
FIG. 1 is a block diagram illustrating a processor for executing instructions to monitor multiple addresses, according to some embodiments.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A processor's instruction set architecture may include instructions to monitor a specified address for write-to-memory activities. For example, a processor's instruction set architecture may include a MONITOR instruction and an MWAIT instruction. The MONITOR instruction allows software to specify an address range to monitor. The MWAIT instruction allows software to instruct the logical processor to enter an optimized state (which may vary depending on implementations) until a write operation to the address range specified by the MONITOR instruction occurs. The MONITOR/MWAIT instructions can be used to monitor a single address range. However, it may be beneficial to be able to monitor multiple non-contiguous addresses instead of monitoring just a single address or a single address range. This would allow software to be asynchronously notified regarding write operations to multiple (non-contiguous) addresses and not just a single address or a single range of addresses. This way, rather than waiting for a single predefined event, software can register multiple events that it is interested in, where each event corresponds to an address that will be written by another actor. Software can then be asynchronously notified when any of the events occur and act upon that event.

Embodiments disclosed herein provide a monitoring infrastructure that allows for monitoring multiple addresses. A new instruction referred to herein as "NMONITOR" is introduced that allows software to specify the addresses to be monitored. Also, a new instruction referred to herein as "NWAIT" is introduced that allows software to instruct the logical processor to enter an optimized state (e.g., low-power mode) until a write operation (or other triggering event) to one of the addresses being monitored (as specified by the NMONITOR instruction) occurs. The NWAIT instruction may return the address for which the write operation occurred to software. Also, a new instruction referred to herein as "NPOLL" is introduced that allows software to determine whether a write operation (or other triggering event) to one of the addresses being monitored (e.g., as specified by the NMONITOR instruction) has occurred. The NPOLL instruction is a non-blocking variant of the NWAIT instruction that may immediately return either an address for which a write operation occurred (e.g., if a write operation to one of the addresses being monitored has occurred) or immediately return an indication that a triggering event for an address being monitored has not occurred.

Embodiments disclosed herein may be advantageous for several use cases. In high-throughput network communications scenarios, the network interface writes incoming data packets directly to a buffer in user-space visible memory. Typically, an application dispatch thread polls on "ready" or "head" address to which the network interface writes. The dispatch thread may use the NMONITOR instruction to register multiple head addresses (corresponding to multiple message queues) for monitoring. The dispatch thread may use the NWAIT instruction to go to sleep until one of the buffers has new data for consumption. The return value of the NWAIT instruction allows the dispatch thread to know which of the buffers has received new data. When compared with active polling techniques, the NWAIT instruction may utilize the processor core's sleep state to reduce power consumption. Also, the NWAIT instruction immediately returns the "ready" address, which frees the software from the overhead involved with searching for a "ready" state over a set of addresses on every poll cycle. This contributes to the reduced power consumption and also improves the user-thread response time.

Fine-grained parallelism has become a staple of high-performance multithreaded programming and event-driven interactive applications, but its usefulness is limited to problems that unify control and data relationships. Tasking models have been proposed that add data dependencies to tasks. However, tracking these data dependencies introduces the scheduling overhead of searching for ready tasks, which limits its usefulness to long-running tasks. Nevertheless, several high-level programming languages are increasingly adopting data-driven asynchronous programming styles, so as to improve the latency or responsiveness of applications. For example, this data-driven asynchronous programming style can be achieved using programming language constructs such as futures/promises or async/await. With the NMONITOR/NWAIT instructions, data-driven task schedulers can avoid the overhead of searching for ready tasks, which makes them suitable for implementing fine-grained parallelism in high-performance computing environments as well as accelerating existing reactive programming constructs (e.g., futures/promises and async/await).

FIG. 1 is a block diagram illustrating a processor for executing instructions to monitor multiple addresses, according to some embodiments. The processor 100 includes instruction storage 102, fetch circuit 103, decode circuit 104, execution circuit 106, monitor unit 120 (which may also be referred to as a monitor circuit), registers 108, memory 110, and retire or commit circuit 112. An instruction is fetched by fetch circuit 103 from instruction storage 102. In one embodiment, the instruction storage 102 comprises any one or more of a cache memory, an on-chip memory, a memory on the same die as the processor 100, an instruction register, a general register, and system memory. Decode circuit 104 decodes the fetched instruction. In one embodiment, the instruction is an NMONITOR instruction or an NWAIT/NPOLL instruction. The decoded instruction is executed by execution circuit 106. Execution circuit 106 is configured to read data from and write data to registers 108 and memory 110. In one embodiment, registers 108 comprise any one or more of a data register, an instruction register, a general register, and an on-chip memory. In one embodiment, memory 110 comprises any one or more of an on-chip memory, a memory on the same die as the processor 100, a memory in the same package as the processor 100, a cache memory, and system memory. Execution circuit 106 is further configured to interact with monitor unit 120 to support the monitoring of multiple addresses. An exemplary embodiment of monitoring unit 120 is illustrated and described with reference to FIG. 3. Retire or commit circuit 112 ensures that execution results are written to or have been written to their destinations, and frees up or releases resources for later use. For this purpose, retire or commit circuit 112 is configured to read data from and write data to register 108 and memory 110.

Figure 2B:
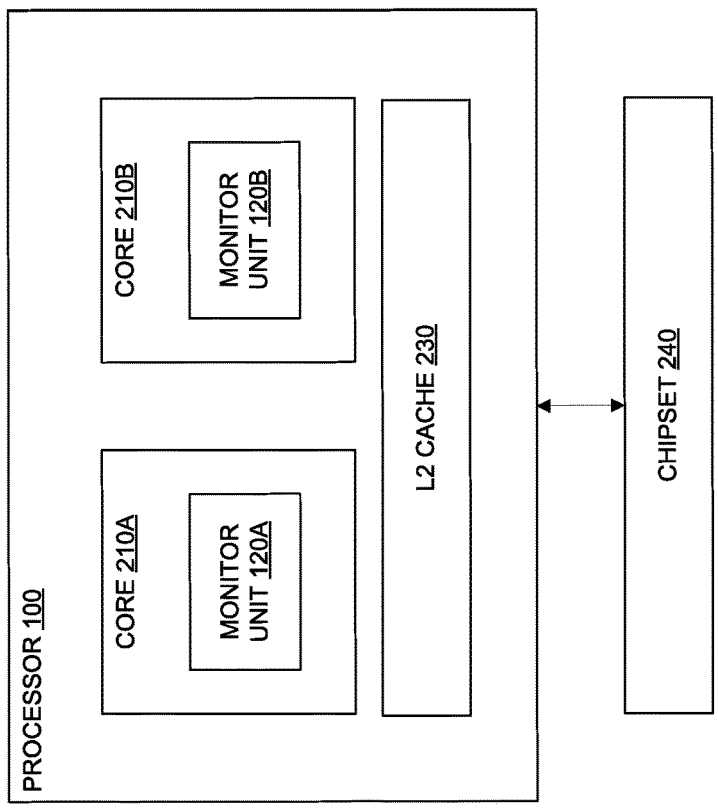
FIG. 2B is a block diagram illustrating a dual-core processor that is configured to monitor multiple addresses that implements a shared L2 cache, according to some embodiments.
Figure 2A:
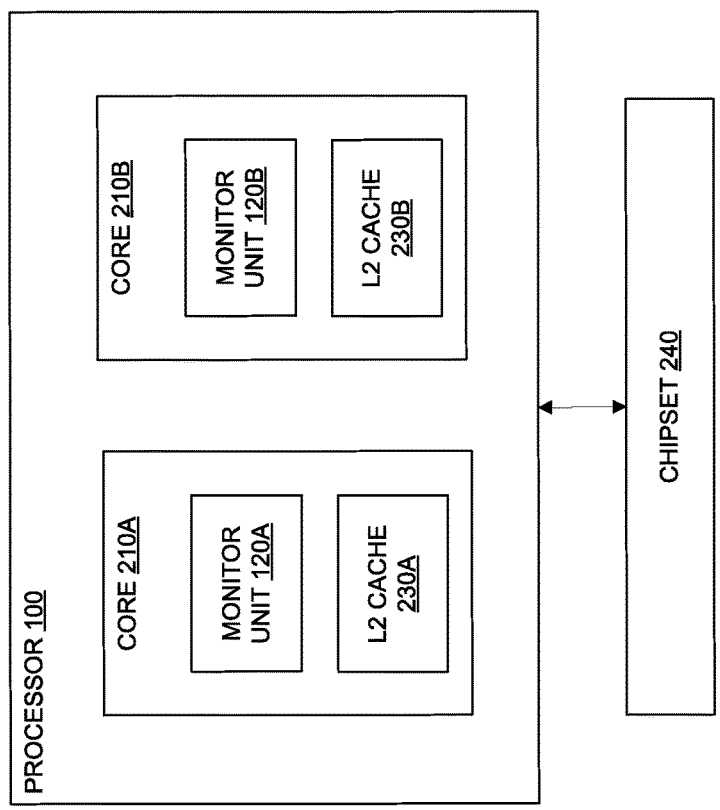
FIG. 2A is a block diagram illustrating a dual-core processor that is configured to monitor multiple addresses, according to some embodiments.

FIG. 2A is a block diagram illustrating a dual-core processor that is configured to monitor multiple addresses, according to some embodiments. The processor 100 includes two processor cores (210A and 210B). Each processor core 210 includes a monitor unit 120. For example, processor core 210A includes monitor unit 120A and processor core 210B includes monitor unit 120B. Each processor core also includes a private L2 cache 230. For example, processor core 210A includes private L2 cache 230A and processor core 210B includes private L2 cache 230B. The processor 100 is connected to a chipset 240 and may be employed to execute program instructions. In one embodiment, a given "physical" processor core 210 implements one or more "logical" cores. For example, under the Intel® Hyperthreading™ architecture, each physical core 210 implements two logical cores. When a processor core 210 implements one or more logical processor cores, a monitor unit 120 may be provisioned for each logical processor core. Throughout the description, physical processor cores 210 and logical processor cores may be generally referred to as "cores" or "processor cores". FIG. 2B is a block diagram illustrating a dual-core processor similar to that illustrated in FIG. 2A, except that the processor 100 implements a shared L2 cache 230. As shown in FIG. 2A, processor core 210A and processor core 210B share L2 cache 230. Although FIG. 2A and FIG. 2B illustrate a dual-core processor, it should be understood that the techniques described herein are equally applicable in contexts where a processor 100 has more than two processor cores 210.

Figure 3:
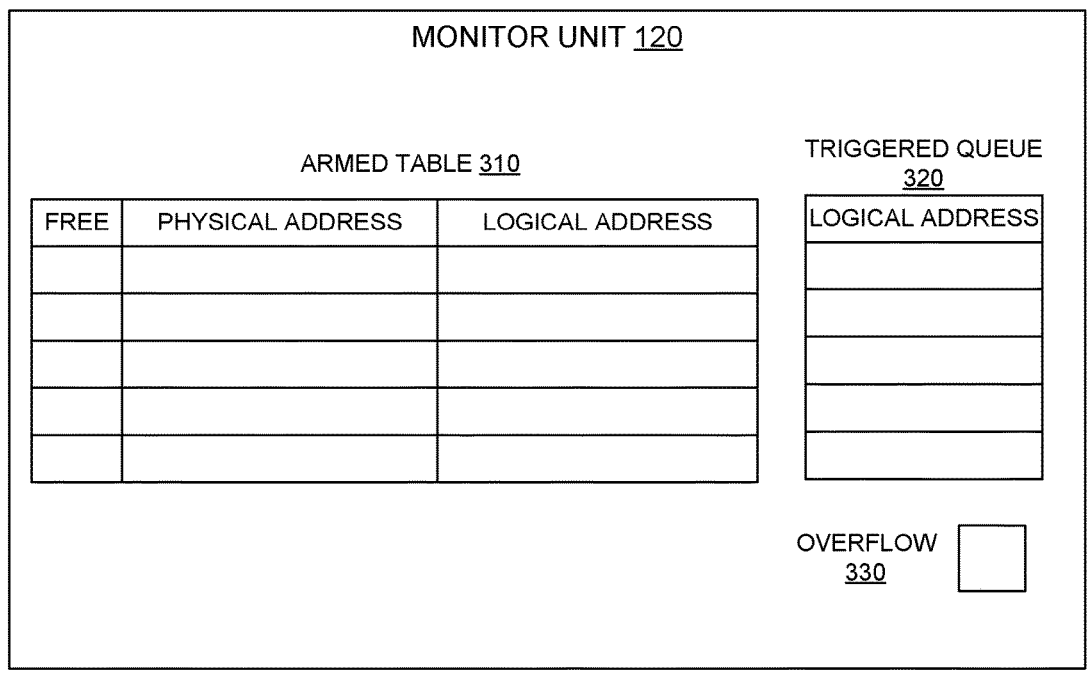
FIG. 3 is a block diagram illustrating a monitor unit, according to some embodiments.

FIG. 3 is a block diagram illustrating a monitor unit, according to some embodiments. The monitor unit 120 includes an armed table 310, a triggered queue 320, and an overflow bit 330. In one embodiment, each core of a multi-core processor 100 includes a monitoring unit 120. In one embodiment, when simultaneous multithreading (SMT) techniques (e.g., Intel® Hyperthreading™) are employed, each thread or hardware context has a dedicated monitor unit 120. The armed table 310 maintains the addresses that are registered to be monitored by the monitor unit 120. In one embodiment, an entry for each address being monitored by the monitor unit 120 is stored in the armed table 310. As shown in the block diagram, the armed table 310 can store up to five entries (since the armed table 310 is provisioned with five rows). It should be understood, however, that in other embodiments, the armed table 310 is capable of storing more or less than five entries. In one embodiment, the armed table 310 includes a free column, a physical address column, and a logical address column. The free column indicates whether an entry is free. The physical address column indicates the physical address of an address that is being monitored. The logical address column indicates the logical address of an address that is being monitored. The triggered queue 320 maintains the logical addresses of the addresses for which a triggering event has occurred. As shown in the block diagram, the triggered queue 320 can store up to five logical addresses (five elements). It should be understood, however, that in other embodiments, the triggered queue 320 is capable of storing more or less than five logical addresses. The overflow bit 330 indicates whether the triggered queue 320 has overflowed.

An NMONITOR instruction may take the address that is to be monitored as an argument (e.g., with cache line granularity). When the NMONITOR instruction is called with a specified address to be monitored, the core that executes the instruction adds an entry for the specified address in its monitor unit 120 (e.g., in the armed table 310). The entry includes the physical address corresponding to the specified address in the physical address column and the logical address corresponding to the specified address (which is the specified address itself when the specified address is a logical address) in the logical address column. In one embodiment, an address translation logic is employed to determine the physical address corresponding to the specified address. The entry is marked as not being free (in the free column) to indicate that the entry is valid/occupied. The core also ensures that the cache line corresponding to the specified address is in (S)hared state in the core's cache (e.g., L2 cache 230). In one embodiment, this is achieved using a cache coherence protocol. For example, assuming a MESI-type (Modified-Exclusive-Shared-Invalid) protocol is used for cache coherency, a cache line in (M)odified state or (E)xclusive state is transitioned to (S)hared state, and an (I)nvalid cache line is loaded into the cache in (S)hared state. This ensures that when another core attempts to write to this cache line, a state transition will occur. This also allows multiple cores to monitor the address because multiple copies of a cache line in (S)hared state are allowed. In a MESI-type protocol, the (S)hared state indicates that the cache line may be stored in other caches and is clean (it matches main memory). At this stage, the monitor unit 120 is configured to monitor the specified address.

In one embodiment, an extra bit is added to each cache line (e.g., in the core's L2 cache 230) to indicate whether the cache line corresponds to an address that is being monitored. In one embodiment, since the cache line corresponding to an address that is being monitored is guaranteed to be in a shared state ((S)hared state in MESI-type protocol), the indication can be encoded implicitly using an unused combination of existing state bits, and thus not take up any extra storage space.

The NMONITOR instruction may be called multiple times, each time with a different address, to register multiple addresses for monitoring (simultaneously). Each call to the NMONITOR instruction adds an entry for an address to be monitored to the armed table 310. If an entry for the address is already in the armed table 310, then the NMONITOR instruction returns a MONITOR-EXISTS fault code to indicate that the address is already being monitored. If a free entry is not available in the armed table 310 (the armed table 310 is full), then the NMONITOR instruction returns a MONITOR-FULL fault code to indicate that the address cannot be monitored. Based on this fault code, software may decide to fall back to an alternative way to detect write operations to the address (e.g., involving hierarchical monitoring structure or polling).

When a triggering event for an address occurs, a trigger event message conveying the physical address of the address is sent to the core's monitor unit 120. The triggering event for an address that causes a trigger event message to be sent to the core's monitor unit 120 may be a state transition of the cache line corresponding to the address from (S)hared state to (I)nvalid state (e.g., when another core writes to the cache line), a state transition from (S)hared state to (M)odified state (e.g., when a core holding an active monitor writes to the cache line), or a voluntary eviction of the cache line from the cache 230. If multiple cores share the cache (or when each core has multiple hardware contexts), each of the respective monitoring units 120 is sent a trigger event message conveying the physical address of the address for which the triggering event occurred. In one embodiment, the trigger event message is received based on snooping a bus that carries information that is used to maintain the coherency status of cache lines.

When the monitor unit 120 receives a trigger event message, the monitor unit 120 checks whether an entry matching the physical address conveyed by the trigger event message exists in the armed table 310 (i.e., a valid (non-free) entry that has a value in the physical address column that matches the physical address conveyed by the trigger event message). If no such entry is found in the armed table 310, then this is considered a spurious triggering event (e.g., caused by another core or thread initiating the monitor) that is silently ignored. If a matching entry is found in the armed table 310, then the entry is freed (e.g., by setting the free column to indicate that the entry is free) and the logical address of the entry is enqueued into the triggered queue 320. In one embodiment, if the logical address of the entry cannot be enqueued into the triggered queue 320 due to the triggered queue 320 being full, then the monitor unit 120 sets the overflow bit 330 to indicate that the triggered queue 320 has overflowed.

When the NWAIT or NPOLL instruction is called, unless there is an error condition (examples of which are described further below), the NWAIT or NPOLL instruction returns the logical address at the head of the triggered queue 320 (assuming the triggered queue 320 is not empty) and this logical address is dequeued from the triggered queue 320. If the overflow bit 330 is set to indicate that the triggered queue 320 has overflowed, then the NWAIT or NPOLL instruction returns a TRIGGERED-OVERFLOW fault code to indicate that the triggered queue 320 has overflowed and the overflow bit is reset. Subsequent calls to the NWAIT or NPOLL instruction will see that the overflow bit is reset and will be able to return any remaining logical addresses in the triggered queue 320.

With the NWAIT instruction, if the triggered queue 320 is empty (it has no elements), then the core (e.g., a physical core or a logical core) may enter an optimized state (which may vary depending on implementations) until a write operation (or other triggering event) to one of the addresses being monitored by the monitor unit 120 occurs. When a write operation (or other triggering event) to one of the addresses being monitored by the monitor unit 120 occurs, the core exits the optimized state and the NWAIT instruction returns the address for which the write operation (or other triggering event) occurred. However, with the NPOLL instruction, if the triggered queue 320 is empty, a NO-TRIGGERED fault code is immediately returned to indicate that a triggering event for the addresses being monitored has not occurred.

In one embodiment, the return value of the NWAIT or NPOLL instruction is stored in a single register (e.g., a destination register). In one embodiment, for valid triggering events, the return value for the NWAIT or NPOLL instruction is a cache line base address, and thus its lower bits (corresponding to a cache line offset) are zero. In one embodiment, for fault conditions, the lower bits indicate a (non-zero) fault code. If both the armed table 310 and the triggered queue 320 are empty, then no future triggering events can be expected and thus the NWAIT or NPOLL instruction returns a NO-ARMED fault code to indicate as such.

Whenever a context switch occurs on the core or the logical address to physical address mapping changes for some reason, all outstanding monitors are cleared. This may be achieved by clearing the entries in the armed table 310, clearing the elements in the triggered queue 320, and resetting the overflow bit 330. Software may detect when this happens because a call to NWAIT or NPOLL will return a NO-ARMED fault code, indicating that a context switch or other event occurred that cleared all outstanding monitors. Software may then re-register the addresses that it is still interested in monitoring (e.g., using the NMONITOR instruction), and proceed as usual.

Figure 4A:
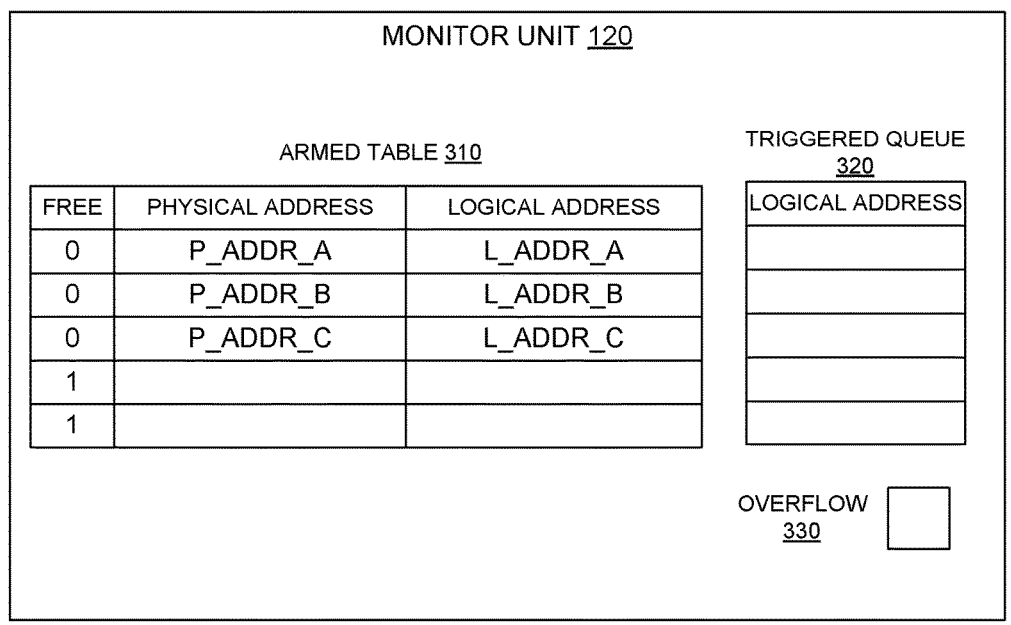
FIG. 4A-4E are diagrams illustrating exemplary operations of the NMONITOR instruction and NWAIT/NPOLL instruction, according to some embodiments.

FIG. 4A is a diagram illustrating exemplary operations of the NMONITOR instruction and NWAIT instruction, according to some embodiments. In this example, software calls the NMONITOR instruction for addresses 1_addr_a, 1_addr_b, and 1_addr_c, respectively. These instructions cause the core (that executes the NMONITOR instructions) to add an entry for each of the addresses to the armed table 310 of its monitoring unit 120 to monitor these addresses. Each entry includes the logical address corresponding to the address (the logical address is the same as the specified address in this example) and the physical address corresponding to the address (e.g., p_addr_a is the physical address corresponding to p_addr_a p_addr_b is the physical address corresponding to 1_addr_b and so forth). Also, the core ensures that the coherency status of the cache lines corresponding to 1_addr_a, 1_addr_b, and 1_addr_c are in a shared state (e.g., using a cache coherence protocol). Software then calls the NWAIT instruction before any triggering events for the addresses being monitored occurs (and thus the triggered queue 320 is empty). Since the triggered queue 320 is empty, the core that executes the NWAIT instruction enters an optimized state.

Figure 4B:
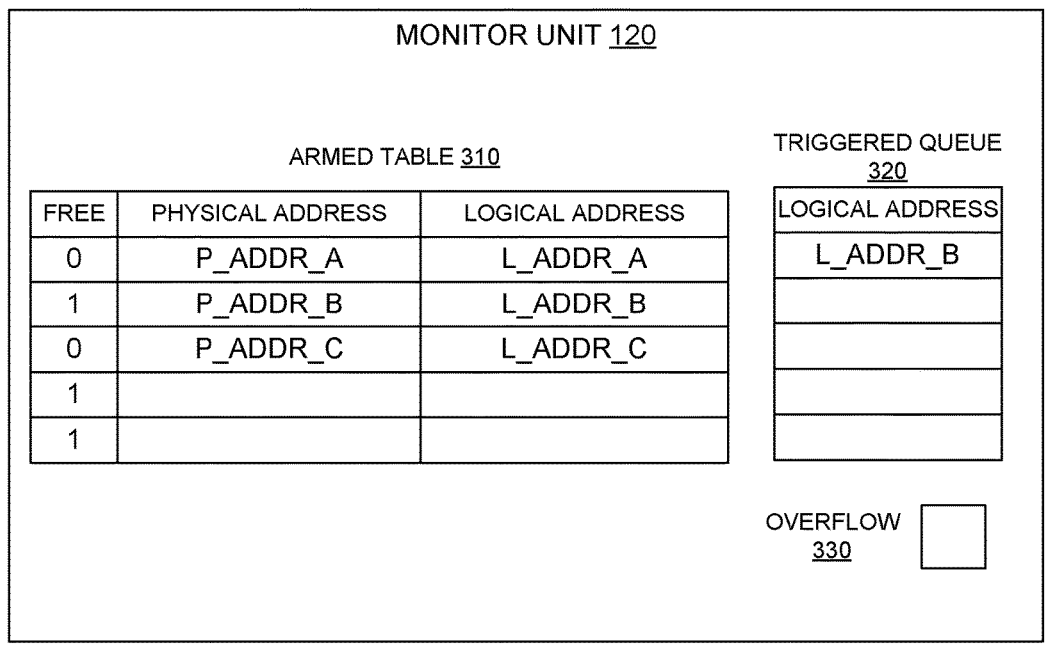

Subsequently, as shown in FIG. 4B, data stored at p_addr_b is modified. This is considered a triggering event for 1_addr_b. The monitor unit 120 is notified of this triggering event. In response, the monitor unit 120 enqueues 1_addr_b into the triggered queue 320 and marks the entry for 1_addr_b in the armed table 310 as being free. In one embodiment, the monitor unit 120 sends a signal to the core to exit the optimized state. The core then exits the optimized state, dequeues 1_addr_b from the triggered queue 320, and provides 1_addr_b as the return value for the previously called NWAIT instruction.

Figure 4C:
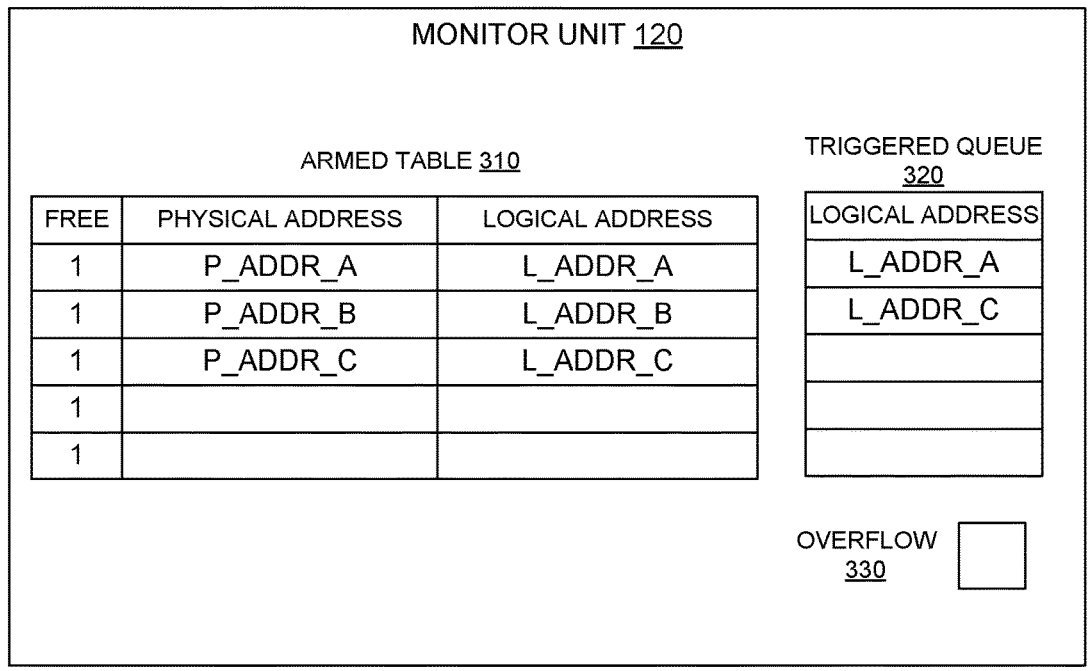

Subsequently, as shown in FIG. 4C, data stored at p_addr_a is modified and data stored at p_addr_c is evicted. These are considered triggering events for 1_addr_a and 1_addr_c, respectively. The monitor unit 120 is notified of these triggering events. In response, the monitor unit 120 enqueues 1_addr_a and 1_addr_c into the triggered queue 320 and marks the entries for 1_addr_a and 1_addr_c in the armed table 310 as being free.

Figure 4D:
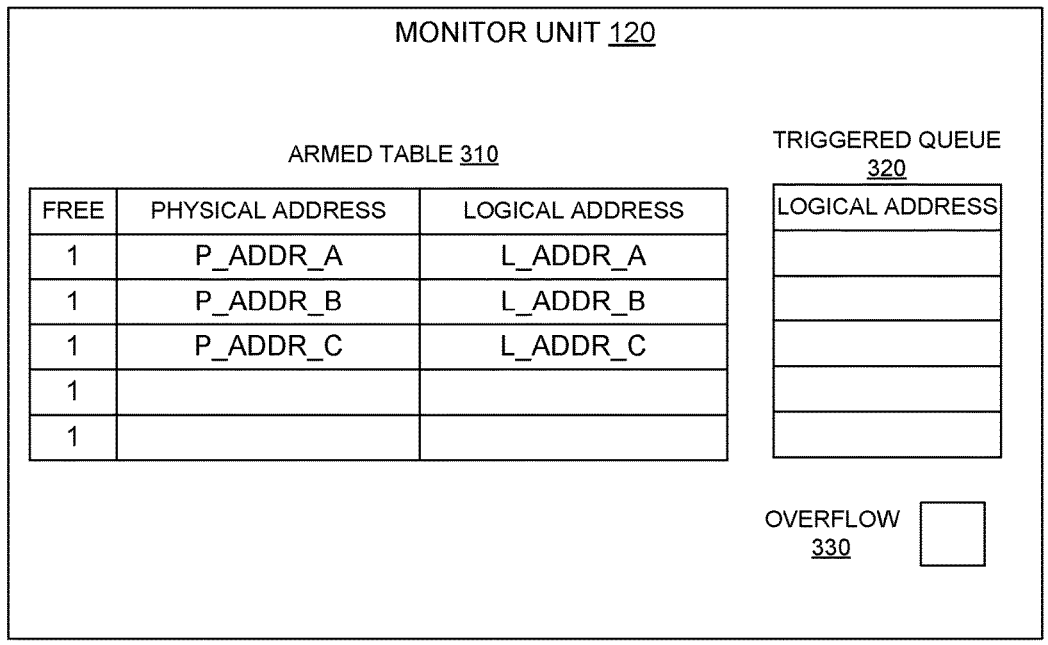

As shown in FIG. 4D, software then calls the NWAIT instruction. Since the triggered queue 320 is not empty, the core provides the logical address at the head of the triggered queue 320 as the return value for the NWAIT instruction, which is 1_addr_a in this example. The core then dequeues 1_addr_a from the triggered queue 320. Once 1_addr_a is dequeued, 1_addr_c is at the head of the triggered queue 320. Subsequently, software calls the NPOLL instruction. Since the triggered queue 320 is not empty, the core provides the logical address at the head of the triggered queue 320 as the return value for the NPOLL instruction, which in this example is now 1_addr_c. The core then dequeues 1_addr_c from the triggered queue 320 (and the triggered queue 320 is now empty).

Figure 4E:
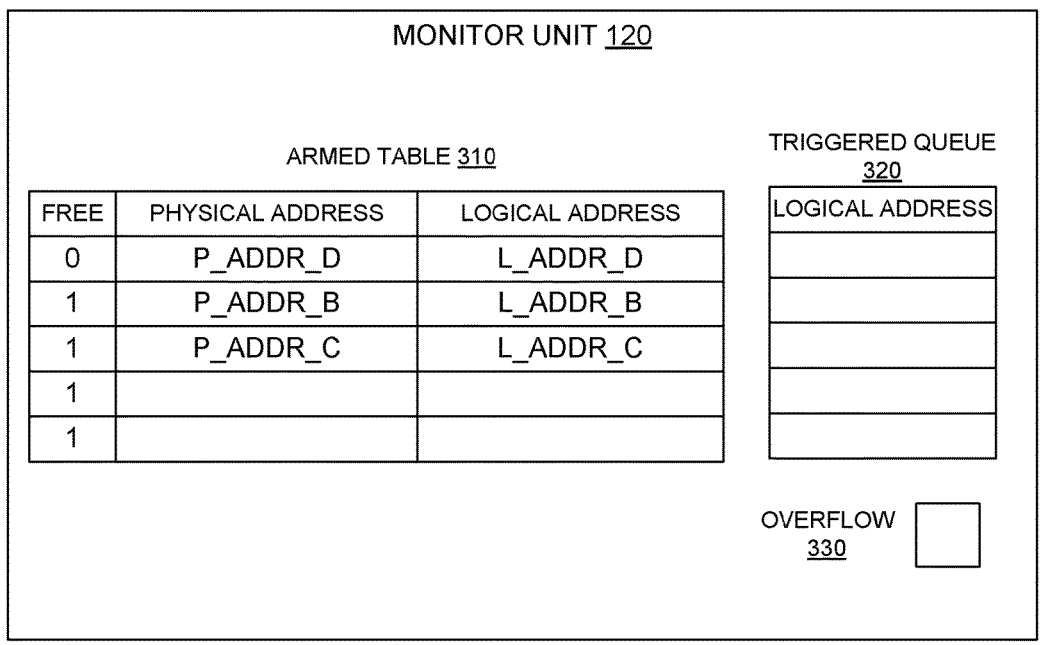

As shown in FIG. 4E, software calls the NMONITOR instruction for address 1_addr_d. This instruction causes the core (that executes the NMONIOTR instruction) to add an entry for 1_addr_d to the armed table 310. Also, the core ensures that the coherency status of the cache line corresponding to 1_addr_d is in a shared state (e.g., using a cache coherence protocol). Software then calls the NPOLL instruction (before a triggering event for 1_addr_d occurs). Since the triggered queue 320 is empty, the core provides a NO-TRIGGERED fault code as the return value for the NPOLL instruction.

Figure 5:
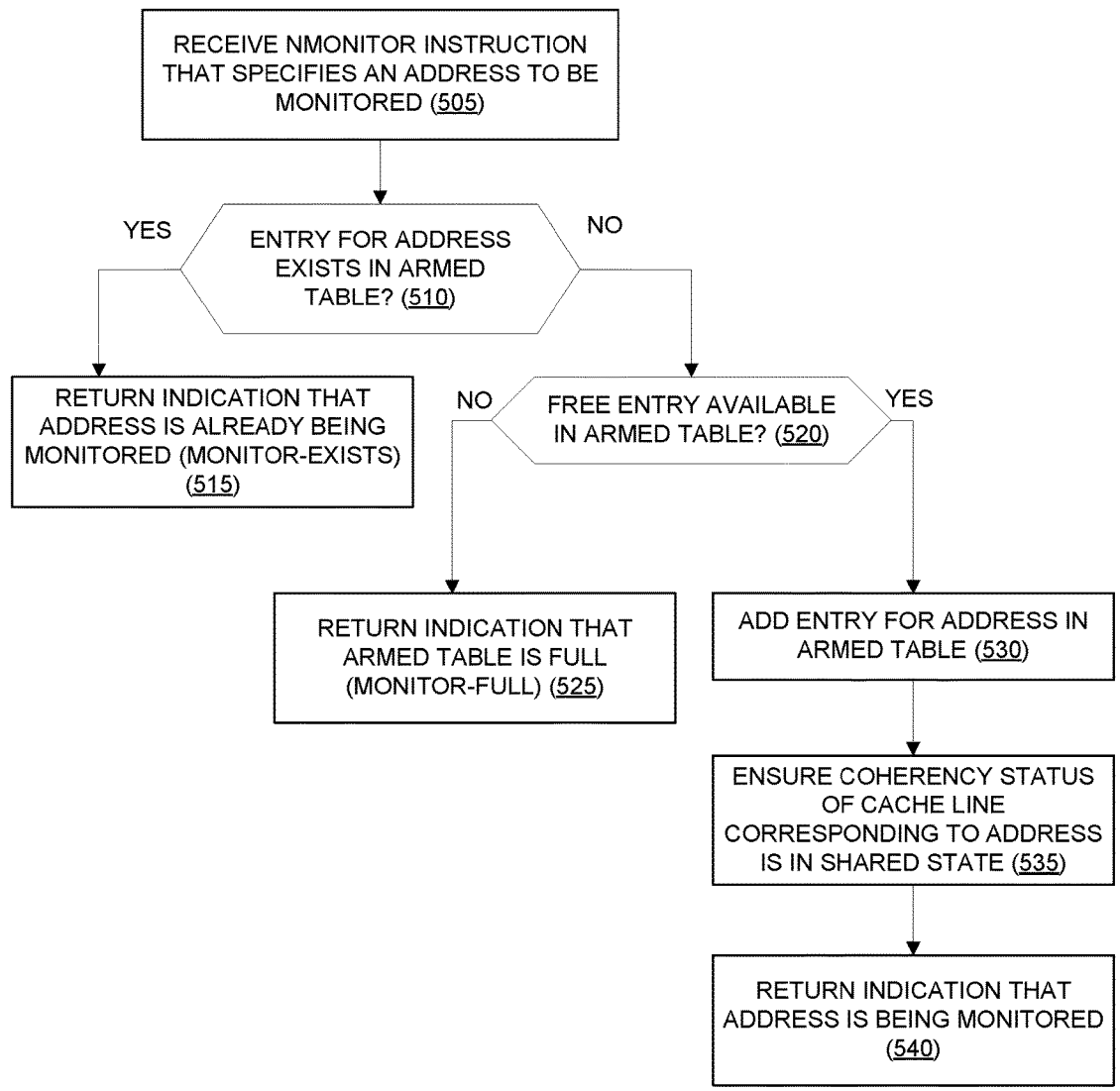
FIG. 5 is a flow diagram of a process performed by a core to execute an NMONITOR instruction, according to some embodiments.

FIG. 5 is a flow diagram of a process performed by a core to execute an NMONITOR instruction, according to some embodiments. The operations in the flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

In one embodiment, the process is initiated when the core receives an NMONITOR instruction that specifies an address to be monitored (block 505). The core determines whether an entry for the address already exists in the armed table 310 (decision block 510). If an entry for the address already exists in the armed table 310, then the core returns an indication that the address is already being monitored (e.g., MONITOR-EXISTS fault code) (block 515). However, if an entry for the address does not already exist in the armed table 310, then the core determines whether a free entry is available in the armed table 310 (decision block 520). If a free entry is not available in the armed table 310, then the core returns an indication that the armed table 310 is full (e.g., MONITOR-FULL fault code) (block 525). However, if the core determines that there is a free entry available in the armed table 310, then the core adds an entry for the address in the armed table 310 (block 530). In one embodiment, this involves marking the entry as no longer being free. The core then ensures that the coherency status of the cache line corresponding to the address is in a shared state (block 535). The core then returns an indication that the address is being monitored (e.g., return value of 0) (block 540).

Figure 6:
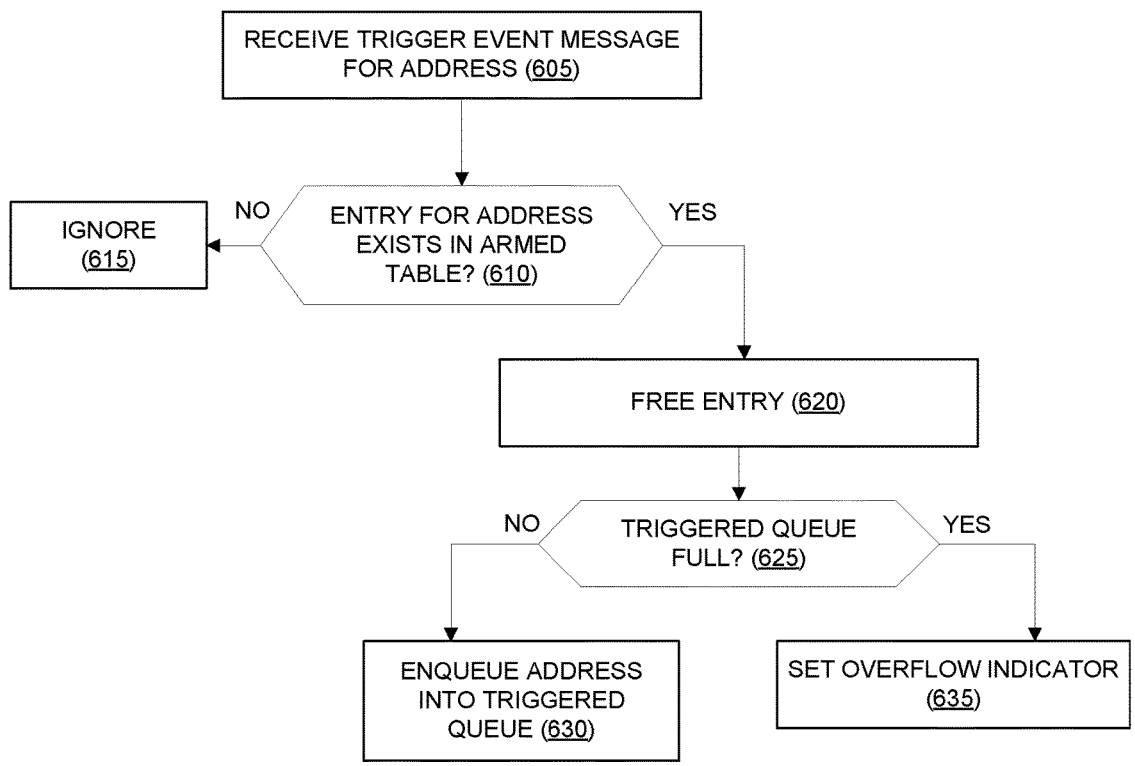
FIG. 6 is a flow diagram of a process performed by a monitor unit of a core to monitor addresses, according to some embodiments.

FIG. 6 is a flow diagram of a process performed by a monitor unit of a core to monitor addresses, according to some embodiments. In one embodiment, the process is performed by a monitor unit 120 (or monitor circuit) of a core. In one embodiment, the process is initiated when the monitor unit 120 receives a trigger event message for an address (block 605). The monitor unit 120 determines whether an entry for the address exists in the armed table 310 (e.g., by comparing the physical address conveyed by the trigger event message to the physical address indicated by entries in the armed table 310) (decision block 610). If an entry for the address does not exist in the armed table 310, then the monitor unit 120 ignores the trigger event message (at least for monitoring purposes) (block 615). However, if an entry for the address exists in the armed table 310, then the monitor unit 120 frees that entry (block 620). The monitor unit 120 then determines whether the triggered queue 320 is full (decision block 625). If the triggered queue 320 is full, then the monitor unit 120 sets the overflow indicator of the triggered queue 320 (block 635). However, if the triggered queue 320 is not full, then the monitor unit 120 enqueues the address (e.g., logical address) into the triggered queue 320 (block 630).

Figure 7:
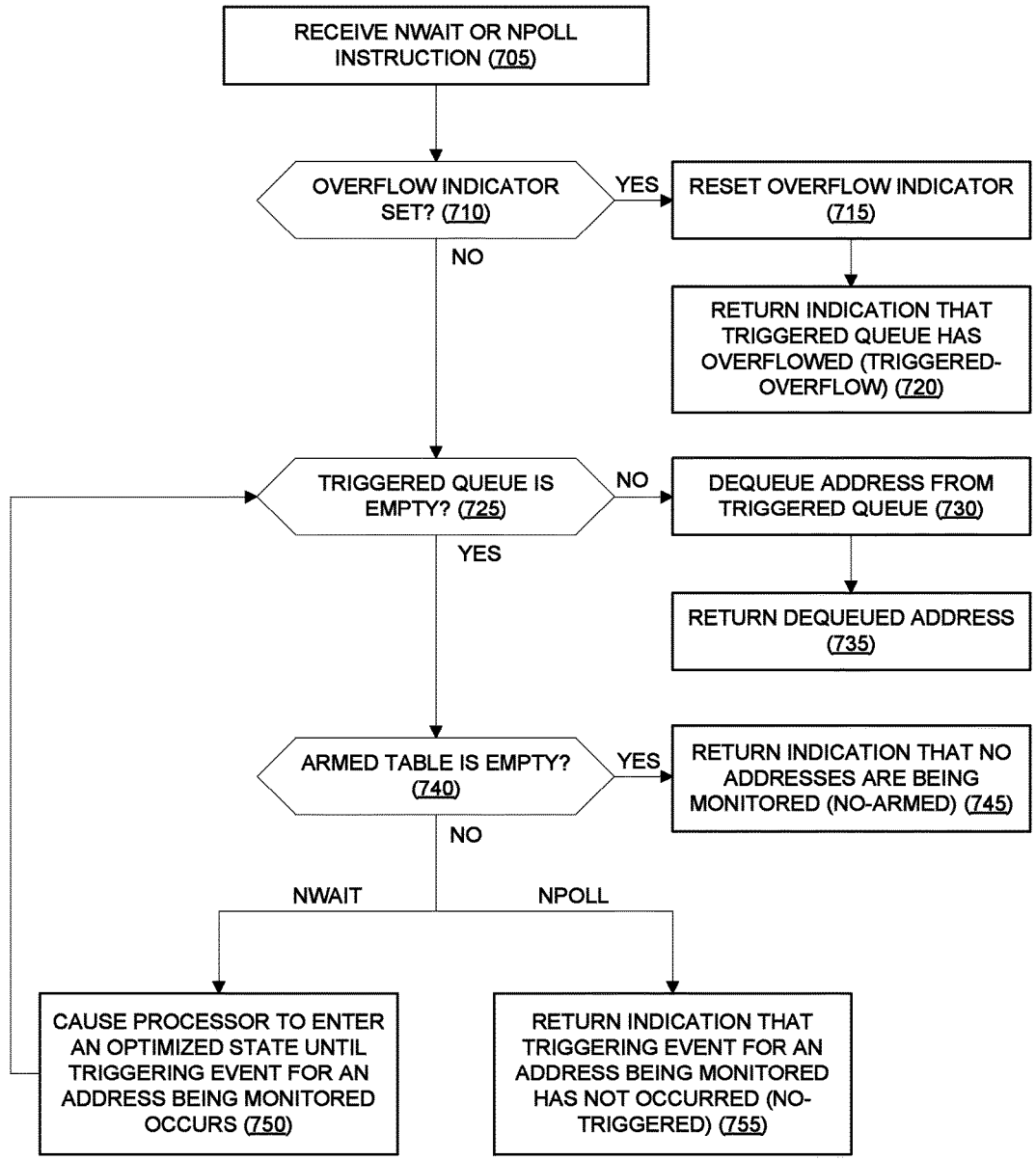
FIG. 7 is a flow diagram of a process performed by a core to execute an NWAIT or NPOLL instruction, according to some embodiments.

FIG. 7 is a flow diagram of a process performed by a core to execute an NWAIT or NPOLL instruction, according to some embodiments. In one embodiment, the process is initiated when the core receives an NWAIT or NPOLL instruction (block 705). The core determines whether the overflow indicator of the triggered queue 320 is set (decision block 710). If the overflow indicator is set, then the core resets the overflow indicator (block 715) and returns an indication that the triggered queue 320 has overflowed (e.g., TRIGGERED-OVERFLOW fault code). However, if the overflow indicator is not set, then the core determines whether the triggered queue 320 is empty (decision block 725). If the triggered queue 320 is not empty, then the core dequeues an address from the triggered queue 320 (block 730) and returns this dequeued address (block 735). However, if the triggered queue 320 is empty, then the core determines whether the armed table 310 is empty (decision block 740). If the armed table 310 is empty, then the core returns an indication that no addresses are being monitored (e.g., NO-ARMED fault code). In the case of the NWAIT instruction, if the armed table 310 is not empty, the core may enter an optimized state (e.g., a power-saving mode) until a triggering event for an address being monitored occurs (block 750). Once a triggering event for an address being monitored occurs, the core may exit the optimized state. At this stage, the address for which the triggering event occurred should be at the head of the triggered queue 320. The core dequeues this address from the triggered queue 320 and returns the dequeued address (blocks 730 and 735). Returning to decision block 740, in the case of the NPOLL instruction, if the armed table 310 is not empty, the core immediately (without entering into an optimized state) returns an indication that a triggering event for an address being monitored has not been detected (e.g., NO-TRIGGERED fault code) (block 755).

Figure 8:
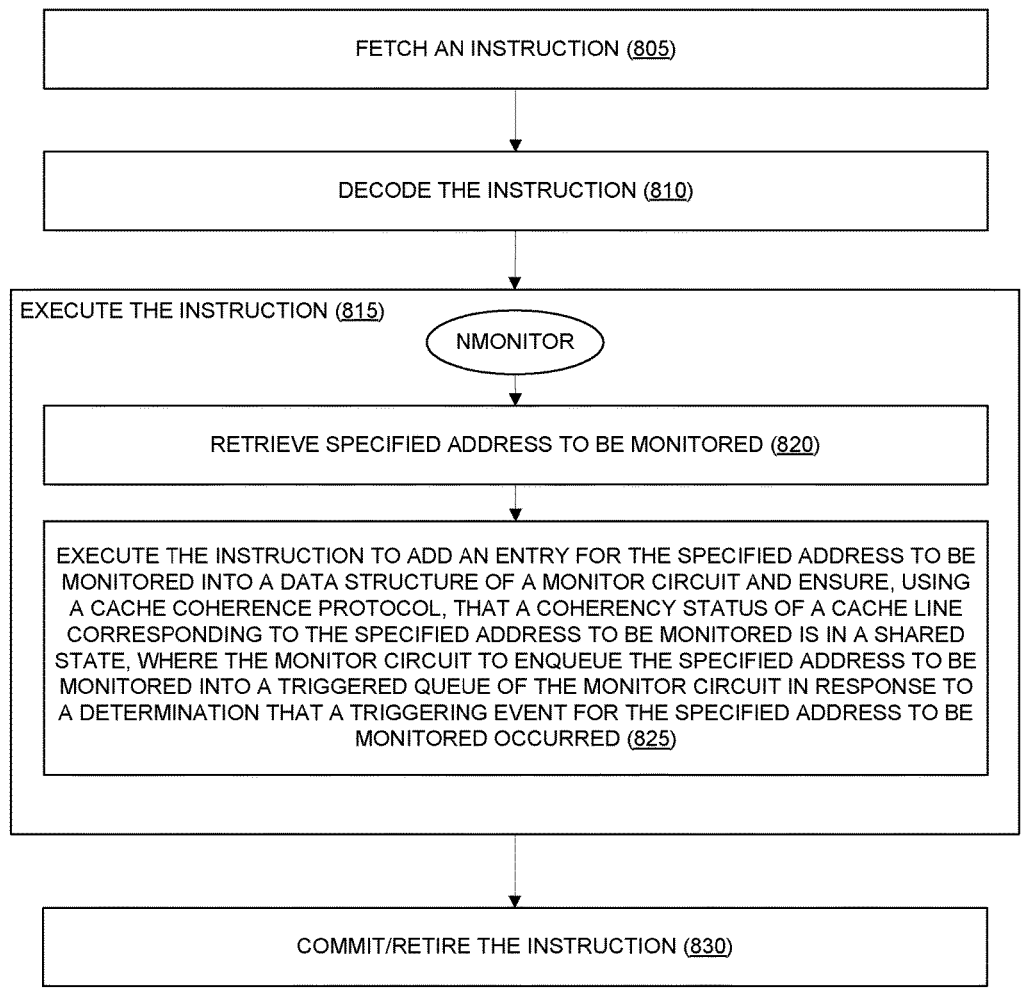
FIG. 8 is a flow diagram of a process performed by a core to process an NMONITOR instruction, according to some embodiments.

FIG. 8 is a flow diagram of a process performed by a core to process an NMONITOR instruction, according to some embodiments. At block 805, an instruction is fetched. For example, an NMONITOR instruction is fetched, where the NMONITOR instruction specifies an address to be monitored. In one embodiment, the instruction is fetched from an instruction storage 102. At block 810, the fetched instruction is decoded by a decode circuit 104. For example, the fetched NMONITOR instruction is decoded. At block 815, the decoded instruction is executed by an execution circuit 106. For the NMONITOR instruction, at block 820, the execution retrieves the specified address to be monitored (e.g., as specified by the NMONITOR instruction). At block 825, the execution further adds an entry for the specified address to be monitored into a data structure (e.g., armed table 310) of a monitor circuit 120 and ensures (using a cache coherence protocol) that a coherency status of a cache line corresponding to the specified address to be monitored is in a shared state, where the monitor circuit 120 is to enqueue the specified address to be monitored into a triggered queue 320 of the monitor circuit 120 in response to a determination that a triggering event for the specified address to be monitored occurred. In one embodiment, the execution is to return an indication that the specified address to be monitored is already being monitored by the monitor circuit 120 (e.g., MONITOR-EXISTS fault code) in response to a determination that the entry for the specified address to be monitored exists in the data structure. In one embodiment, the execution is to return an indication that the data structure is full (e.g., MONITOR-FULL fault code) in response to a determination that there is no free entry available in the data structure. In one embodiment, the monitor circuit 120 is to free the entry for the specified address to be monitored in response to the determination that the triggering event for the specified address to be monitored occurred. In one embodiment, the monitor circuit 120 includes an overflow indicator (e.g., overflow bit 330), and the monitor circuit 120 is to set the overflow indicator in response to a determination that the triggered queue 320 has overflowed. In one embodiment, the monitor circuit 120 is to determine that a triggering event for the specified address being monitored occurred based on a determination that that the coherency status of the cache line corresponding to the specified address to be monitored has changed (e.g., based on receiving a trigger event message). In one embodiment, the entry for the specified address to be monitored includes an indication of a logical address corresponding to the specified address to be monitored and an indication of a physical address corresponding to the specified address to be monitored (e.g., as shown in FIG. 4A). In one embodiment, at block 830, the instruction is committed or retired.

Figure 9:
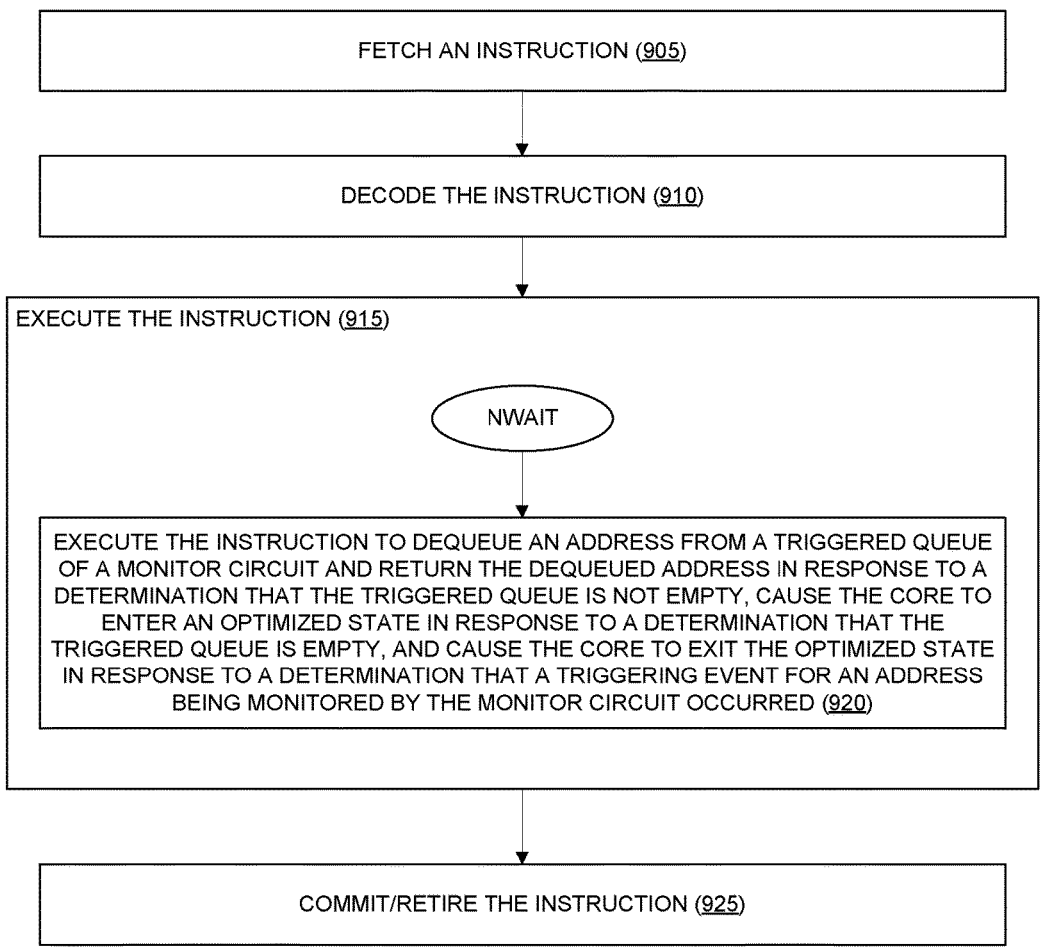
FIG. 9 is a flow diagram of a process performed by a processor core to process an NWAIT instruction, according to some embodiments.

FIG. 9 is a flow diagram of a process performed by a core to process an NWAIT instruction, according to some embodiments. At block 905, an instruction is fetched. For example, an NWAIT instruction is fetched. In one embodiment, the instruction is fetched from an instruction storage 102. At block 910, the fetched instruction is decoded by a decode circuit 104. For example, the fetched NWAIT instruction is decoded. At block 915, the decoded instruction is executed by an execution circuit 106. For the NWAIT instruction, at block 920, the execution dequeues an address from a triggered queue 320 of a monitor circuit 120 and returns the dequeued address in response to a determination that the triggered queue 320 is not empty, causes the core to enter an optimized state in response to a determination that the triggered queue 320 is empty, and causes the core to exit the optimized state in response to a determination that a triggering event for an address being monitored by the monitor circuit 120 occurred. In one embodiment, the monitor circuit 120 includes an overflow indicator (e.g., overflow bit 330), and the execution is to return an indication that the triggered queue 320 has overflowed (e.g., TRIGGERED-OVERVLOW fault code) in response to a determination that the overflow indicator is set and reset the overflow indicator. In one embodiment, the execution is to return an indication that no addresses are being monitored by the monitor circuit 120 (e.g., NO-ARMED fault code) in response to a determination that the triggered queue 320 is empty and the data structure (e.g., armed table 310) is empty. In one embodiment, the execution is to determine that the data structure is empty based on a determination that a content of the data structure indicates that no addresses are being monitored by the monitor circuit 120. In one embodiment, the execution is to store the dequeued address in a destination register. In one embodiment, at block 925, the instruction is committed or retired.

Figure 10:
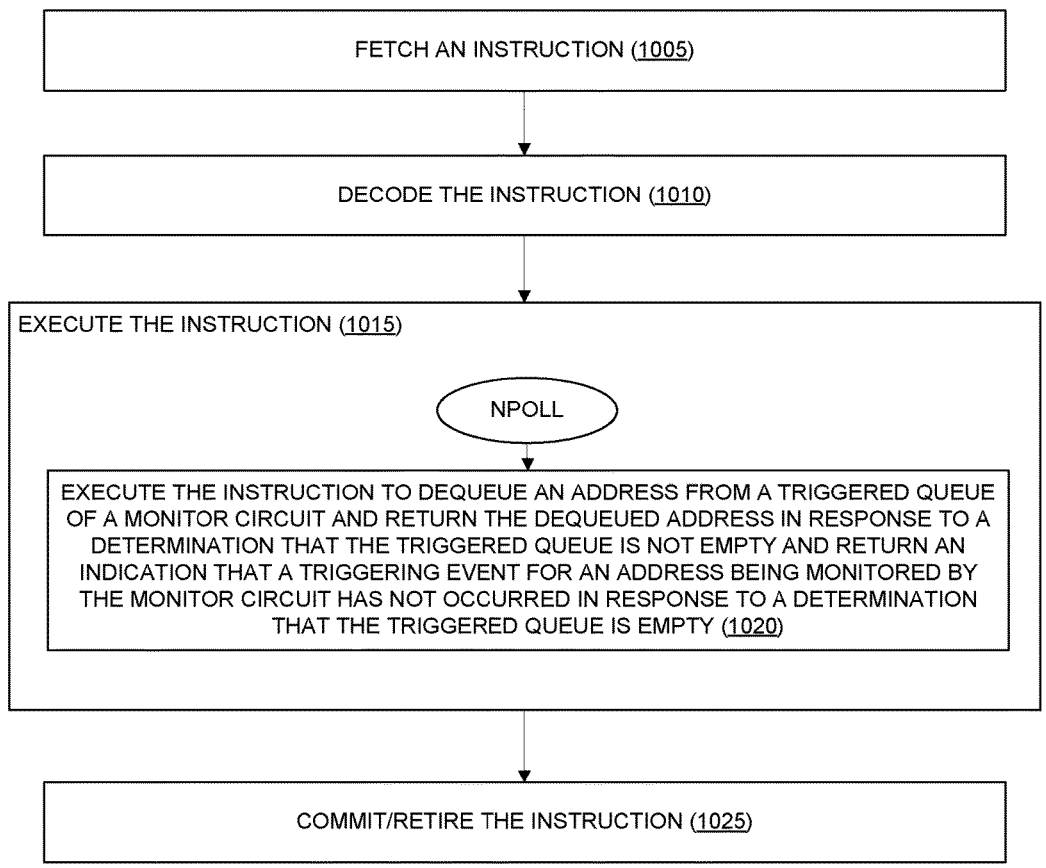
FIG. 10 is a flow diagram of a process performed by a core to process an NPOLL instruction, according to some embodiments.

FIG. 10 is a flow diagram of a process performed by a core to process an NPOLL instruction, according to some embodiments. At block 1005, an instruction is fetched. For example, an NPOLL instruction is fetched. In one embodiment, the instruction is fetched from an instruction storage 102. At block 1010, the fetched instruction is decoded by a decode circuit 104. For example, the fetched NPOLL instruction is decoded. At block 1015, the decoded instruction is executed by an execution circuit 106. For the NPOLL instruction, at block 1020, the execution dequeues an address from a triggered queue 320 of a monitor circuit 120 and returns the dequeued address in response to a determination that the triggered queue 320 is not empty and returns an indication that a triggering event for an address being monitored by the monitor circuit 120 has not occurred (e.g., NO-TRIGGERED fault code) in response to a determination that the triggered queue 320 is empty. In one embodiment, the monitor circuit 120 includes an overflow indicator (e.g., overflow bit 330), and the execution is to return an indication that the triggered queue 320 has overflowed in response to a determination that the overflow indicator is set and reset the overflow indicator. In one embodiment, the execution is to return an indication that no addresses are being monitored by the monitor circuit 120 in response to a determination that the triggered queue 320 is empty and the data structure is empty. In one embodiment, the execution is to determine that the data structure is empty based on a determination that a content of the data structure indicates that no addresses are being monitored by the monitor circuit 120. In one embodiment, the execution is to store the dequeued address in a destination register. In one embodiment, at block 1025, the instruction is committed or retired.

Figure 11:
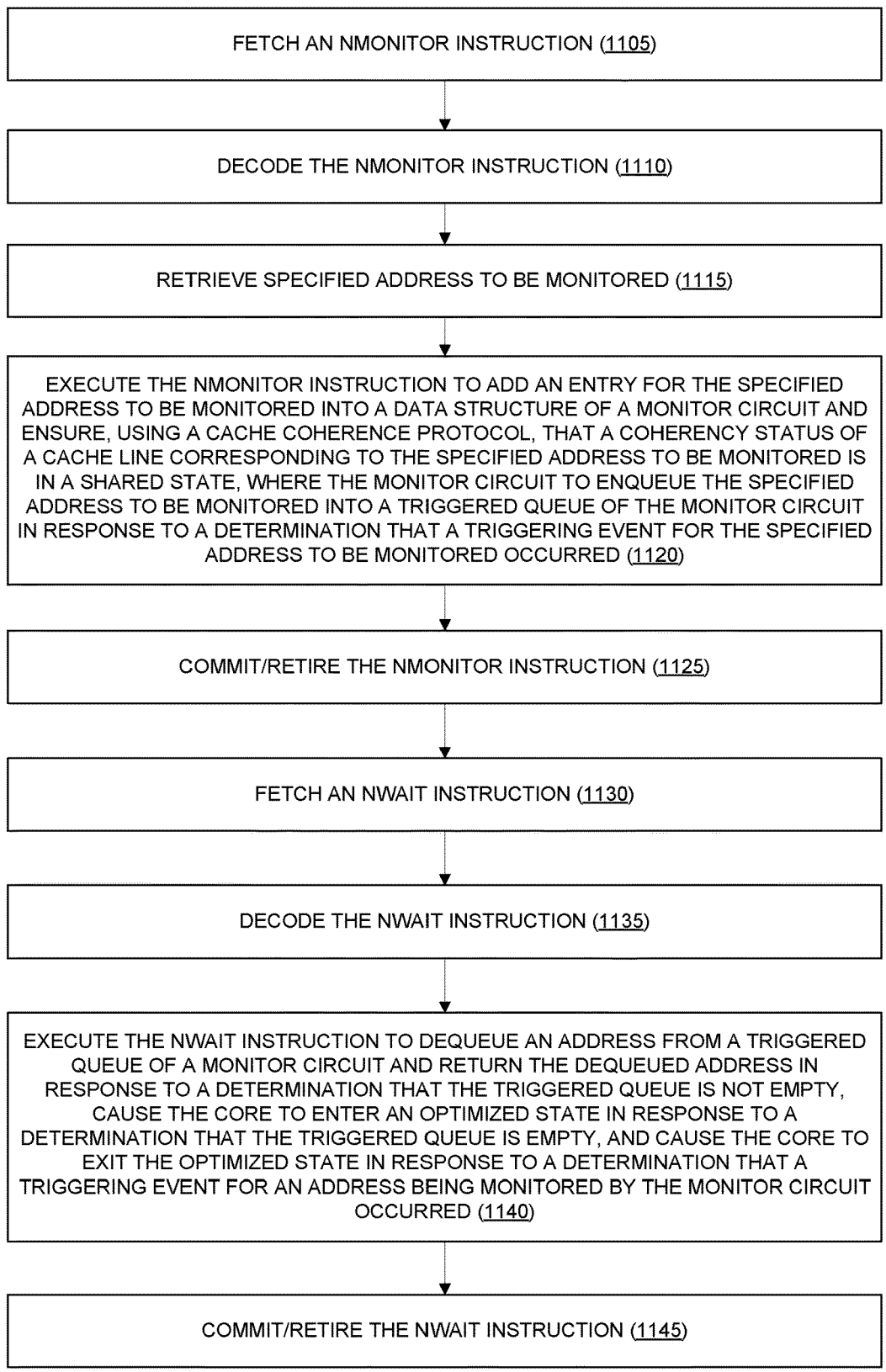
FIG. 11 is a flow diagram of a process performed by a core to process an NMONITOR instruction followed by an NWAIT instruction, according to some embodiments.

FIG. 11 is a flow diagram of a process performed by a core to process an NMONITOR instruction followed by an WAIT instruction, according to some embodiments. At block 1105, an NMONITOR instruction is fetched, where the NMONITOR instruction specifies an address to be monitored. In one embodiment, the NMONITOR instruction is fetched from an instruction storage 102. At block 1110, the fetched NMONITOR instruction is decoded by a decode circuit 104. At block 1115, the address specified by the NMONITOR instruction is retrieved. At block 1120, the NMONITOR instruction is executed by an execution circuit 106 to add an entry for the specified address to be monitored into a data structure (e.g., armed table 310) of a monitor circuit 120 and ensure (using a cache coherence protocol) that a coherency status of a cache line corresponding to the specified address to be monitored is in a shared state, where the monitor circuit 120 is to enqueue the specified address to be monitored into a triggered queue 320 of the monitor circuit 120 in response to a determination that a triggering event for the specified address to be monitored occurred. In one embodiment, at block 1125, the NMONITOR instruction is committed or retired.

The NMONITOR instruction thus registers a specified address to be monitored by the monitor circuit 120. The NMONITOR instruction may be called multiple times, each time with a different address, to register multiple addresses for monitoring. The number of addresses that can be monitored simultaneously is only limited by the size of the data structure (e.g., armed table 310).

At block 1130, an NWAIT instruction is fetched. In one embodiment, the NWAIT instruction is fetched from an instruction storage 102. At block 1135, the fetched NWAIT instruction is decoded by a decode circuit 104. At block 1140, the NWAIT instruction is executed by an execution circuit 160 to dequeue an address from a triggered queue 320 of a monitor circuit 120 and return the dequeued address in response to a determination that the triggered queue 320 is not empty, cause the core to enter an optimized state in response to a determination that the triggered queue 320 is empty, and cause the core to exit the optimized state in response to a determination that a triggering event for an address being monitored by the monitor circuit 120 occurred. In one embodiment, at block 1145, the NWAIT instruction is committed or retired.

The NWAIT instruction works in concert with the NMONITOR instruction to either return an address being monitored (which was registered by the NMONITOR instruction) for which a triggering event has occurred or cause the core to enter an optimized state if a triggering event for an addresses being monitored (which could potentially include multiple addresses registered by the NMONITOR instruction) has not occurred.

Figure 12:
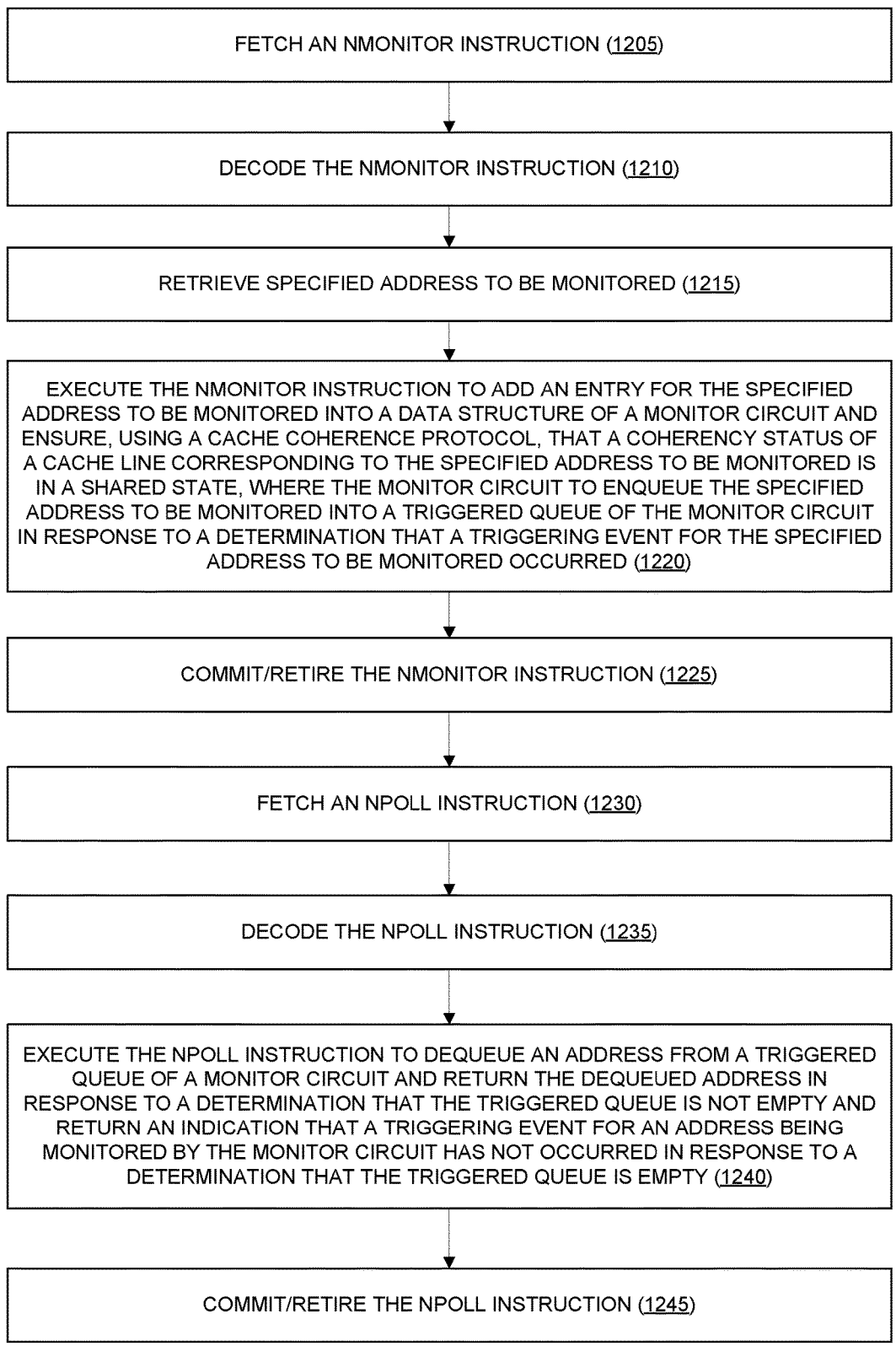
FIG. 12 is a flow diagram of a process performed by a core to process an NMONITOR instruction followed by an NPOLL instruction.

FIG. 12 is a flow diagram of a process performed by a core to process an NMONITOR instruction followed by an NPOLL instruction, according to some embodiments. At block 1205, an NMONITOR instruction is fetched, where the NMONITOR instruction specifies an address to be monitored. In one embodiment, the NMONITOR instruction is fetched from an instruction storage 102. At block 1210, the fetched NMONITOR instruction is decoded by a decode circuit 104. At block 1215, the address specified by the NMONITOR instruction is retrieved. At block 1220, the NMONITOR instruction is executed by an execution circuit 106 to add an entry for the specified address to be monitored into a data structure (e.g., armed table 310) of a monitor circuit 120 and ensure (using a cache coherence protocol) that a coherency status of a cache line corresponding to the specified address to be monitored is in a shared state, where the monitor circuit 120 is to enqueue the specified address to be monitored into a triggered queue 320 of the monitor circuit 120 in response to a determination that a triggering event for the specified address to be monitored occurred. In one embodiment, at block 1225, the NMONITOR instruction is committed or retired.

The NMONITOR instruction thus registers a specified address to be monitored by the monitor circuit 120. The NMONITOR instruction may be called multiple times, each time with a different address, to register multiple addresses for monitoring. The number of addresses that can be monitored simultaneously is only limited by the size of the data structure (e.g., armed table 310).

At block 1230, an NPOLL instruction is fetched. In one embodiment, the NPOLL instruction is fetched from an instruction storage 102. At block 1235, the fetched NPOLL instruction is decoded by a decode circuit 104. At block 1240, the NPOLL instruction is executed by an execution circuit 106 to dequeue an address from a triggered queue 320 of a monitor circuit 120 and return the dequeued address in response to a determination that the triggered queue 320 is not empty and return an indication that a triggering event for an address being monitored by the monitor circuit 120 has not occurred in response to a determination that the triggered queue 320 is empty. In one embodiment, at block 1245, the NWAIT instruction is committed or retired.

The NPOLL instruction works in concert with the NMONITOR instruction to either return an address for which a triggering event has occurred (which was registered using the NMONITOR instruction) or returns an indication that a triggering event for an address being monitored has not occurred if a triggering event for an addresses being monitored (which could potentially include multiple addresses registered by the NMONITOR instruction) has not occurred.

Throughout the description, reference is made to an NMONITOR instruction and NWAIT/NPOLL instruction. It should be understood that this nomenclature is provided by way of example, and that other embodiments may refer to these instructions using a different name.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
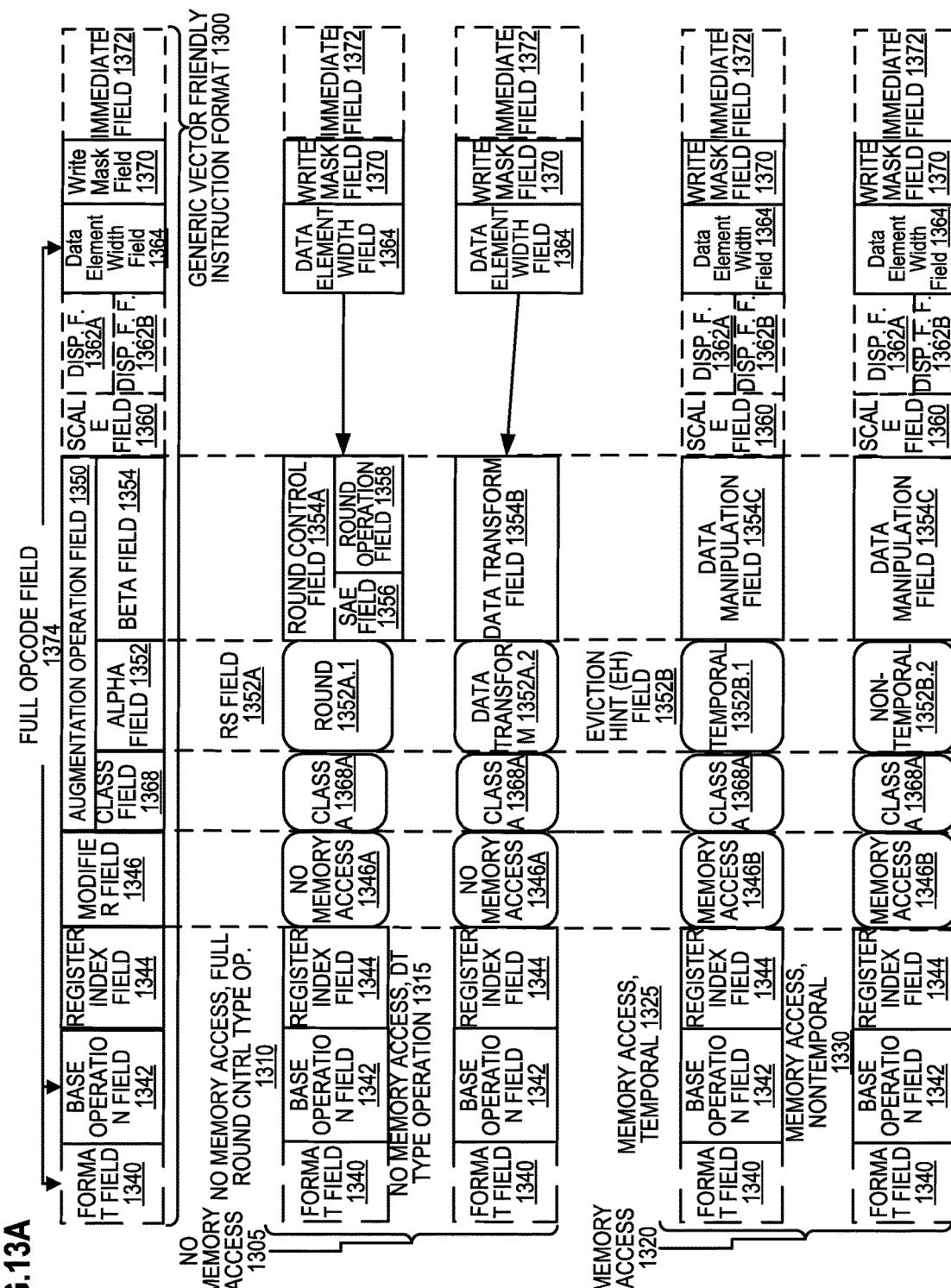
FIGS. 13A-13B are block diagrams illustrating a generic vector friendly instruction format and instruction templates thereof according to embodiments of the invention.
Figure 13B:
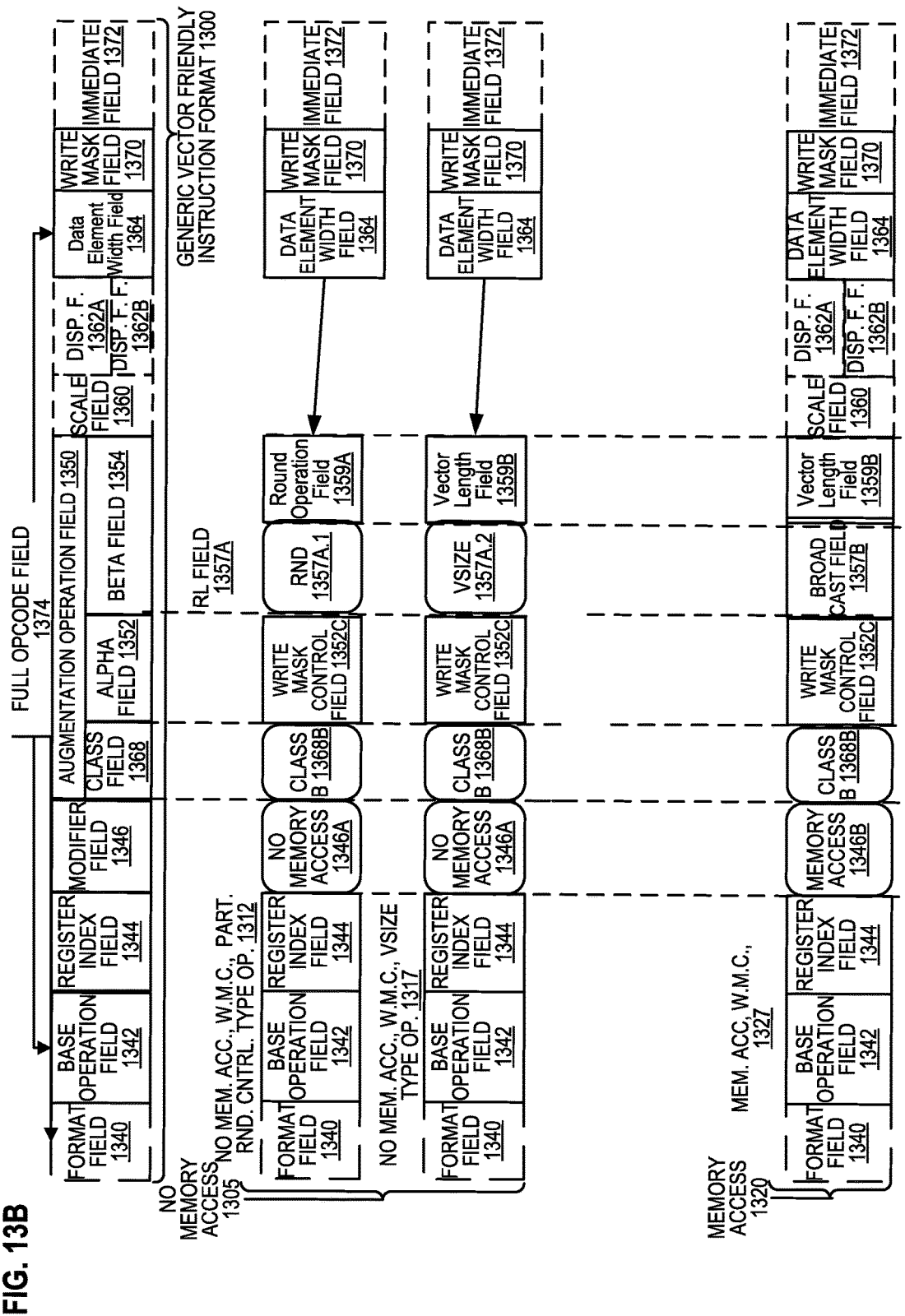

FIGS. 13A-13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*index+base$).

Displacement Field 1362A—its content is used as part of memory address generation (e.g., for address generation that uses $2^{scale}*index+base+displacement$).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*index+base+scaled\ displacement$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A-B, the contents of this field select between class A and class B instructions. In FIGS. 13A-B, rounded corner squares are used to indicate a specific value is present in a field (e.g., class A 1368A and class B 1368B for the class field 1368 respectively in FIGS. 13A-B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z)

field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed. In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14A is a block diagram illustrating an exemplary specific vector friendly instruction format according to embodiments of the invention. FIG. 14A shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14A map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0x62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]—R), EVEX.X bit field (EVEX byte 1, bit [6]—X), and 1357BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]—mmmm)—its content encodes an implied leading opcode byte (0F, 0F 38, or 0F 3).

Data element width field 1364 (EVEX byte 2, bit [7]—W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]—U)—If EVEX.U=0, it indicates class A or EVEX.U0; if EVEX.U=1, it indicates class B or EVEX.U1.

Prefix encoding field 1425 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]—SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
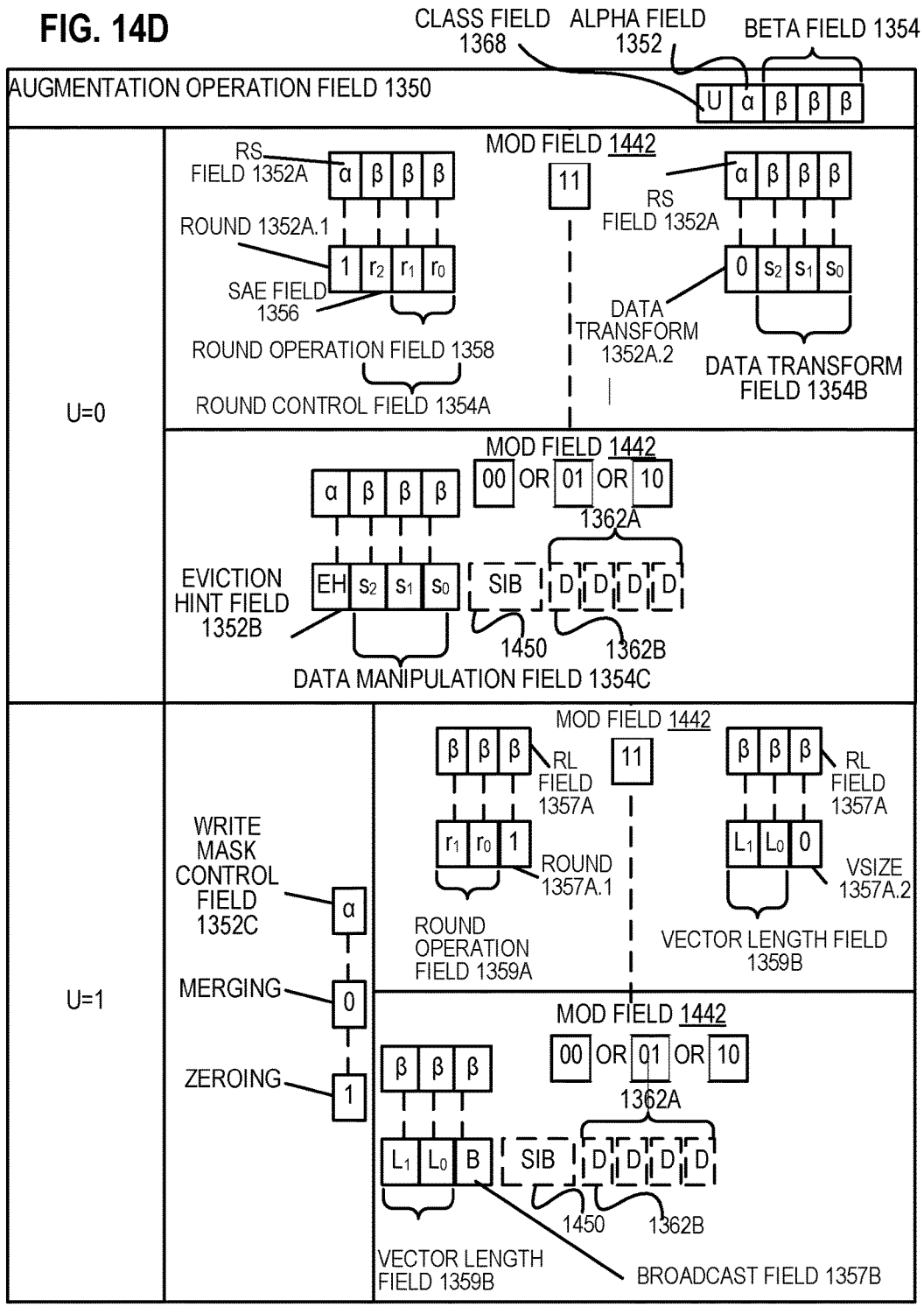
FIG. 14D is a block diagram illustrating the fields of the specific vector friendly instruction format 1400 that make up the augmentation operation field 1350 according to one embodiment of the invention.

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]—EH) is interpreted as the rs field 1352A. When the rs field 1352A contains a 1 (round 1352A.1), the beta field 1354 (EVEX byte 3, bits [6:4]—SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]—SSS) is interpreted as a three bit data transform field 1354B. When U=0 and the MOD field 1442 contains 00, 01, or 10 (signifying a memory access operation), the alpha field 1352 (EVEX byte 3, bit [7]—EH) is interpreted as the eviction hint (EH) field 1352B and the beta field 1354 (EVEX byte 3, bits [6:4]—SSS) is interpreted as a three bit data manipulation field 1354C.

When U=1, the alpha field 1352 (EVEX byte 3, bit [7]—EH) is interpreted as the write mask control (Z) field 1352C. When U=1 and the MOD field 1442 contains 11 (signifying a no memory access operation), part of the beta field 1354 (EVEX byte 3, bit [4]—$S_0$) is interpreted as the RL field 1357A; when it contains a 1 (round 1357A.1) the rest of the beta field 1354 (EVEX byte 3, bit [6-5]—$S_{2-1}$) is interpreted as the round operation field 1359A, while when the RL field 1357A contains a 0 (VSIZE 1357.A2) the rest of the beta field 1354 (EVEX byte 3, bit [6-5]—$S_{2-1}$) is interpreted as the vector length field 1359B (EVEX byte 3, bit [6-5]—$L_{1-0}$). When U=1 and the MOD field 1442 contains 00, 01, or 10 (signifying a memory access operation), the beta field 1354 (EVEX byte 3, bits [6:4]—SSS) is interpreted as the vector length field 1359B (EVEX byte 3, bit [6-5]—$L_{1-0}$) and the broadcast field 1357B (EVEX byte 3, bit [4]—B).

Exemplary Register Architecture

Figure 15:
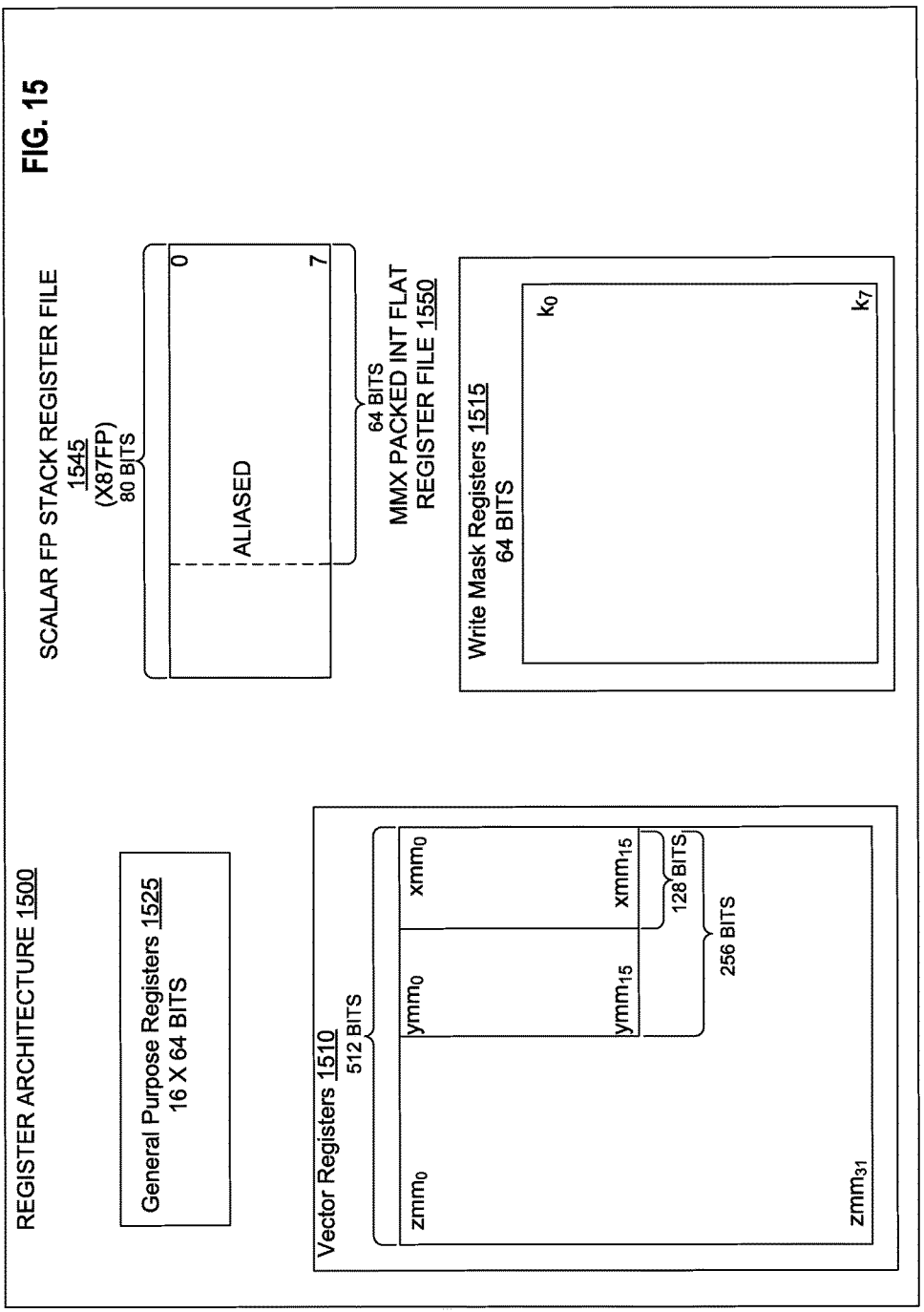
FIG. 15 is a block diagram of a register architecture 1500 according to one embodiment of the invention.

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

| Adjustable Vector Length | Class | Operations | Registers |
| --- | --- | --- | --- |
| Instruction Templates that do not include the vector length field 1359B | A (FIG. 13A; U = 0) | 1310, 1315, 1325, 1330 | zmm registers (the vector length is 64 byte) |
|  | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-order and Out-of-Order Core Block Diagram

Figure 16A:
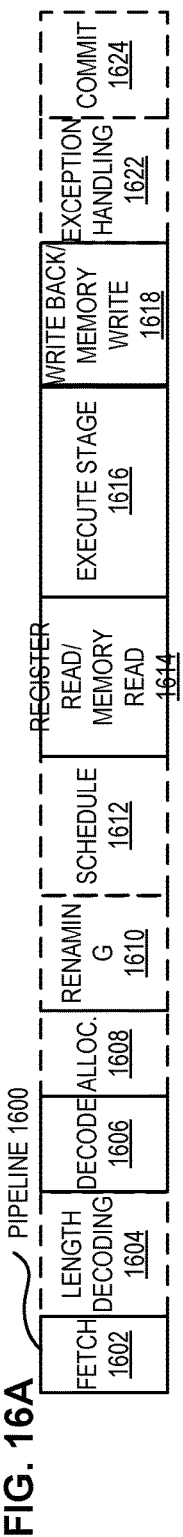
FIG. 16A is a block diagram illustrating both an exemplary in-order pipeline and an exemplary register renaming, out-of-order issue/execution pipeline according to embodiments of the invention.
Figure 16B:
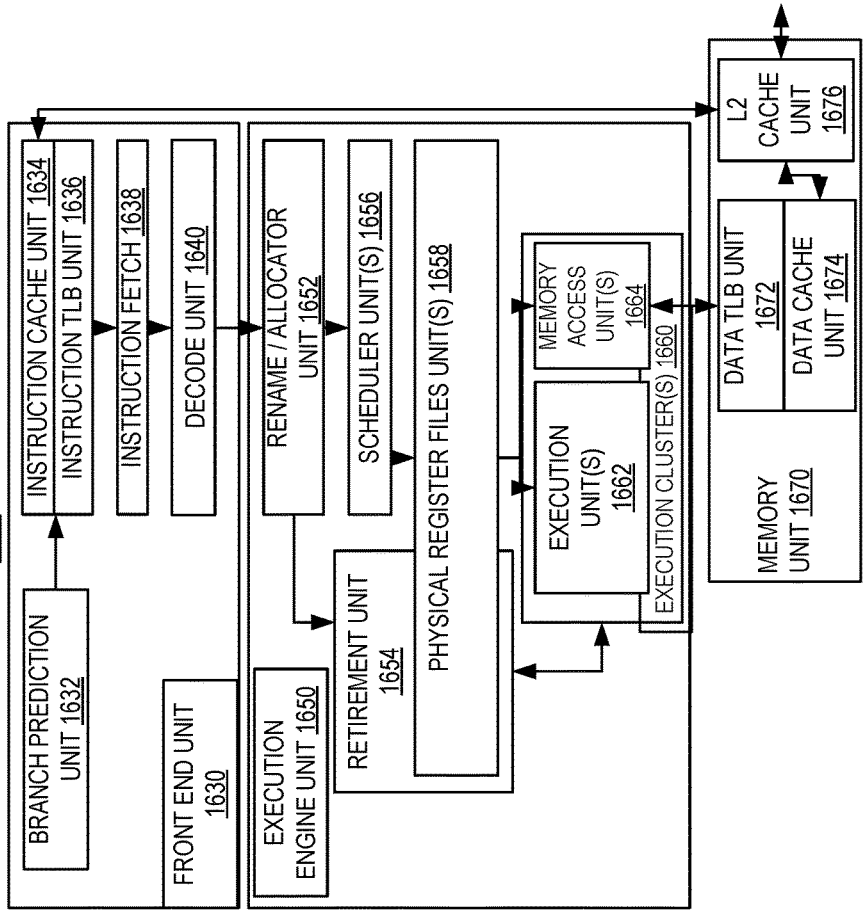
FIG. 16B is a block diagram illustrating both an exemplary embodiment of an in-order architecture core and an exemplary register renaming, out-of-order issue/execution architecture core to be included in a processor according to embodiments of the invention.

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading™ technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 17A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
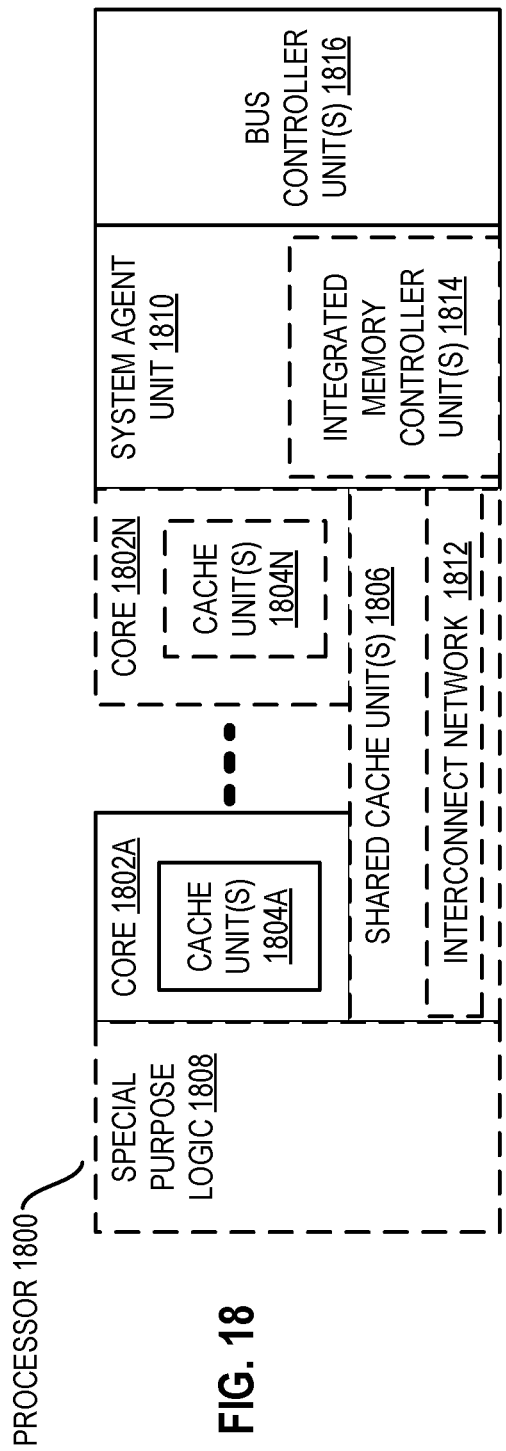
FIG. 18 is a block diagram of a processor 1800 that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808 (integrated graphics logic 1808 is an example of and is also referred to herein as special purpose logic), the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802-A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19-22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
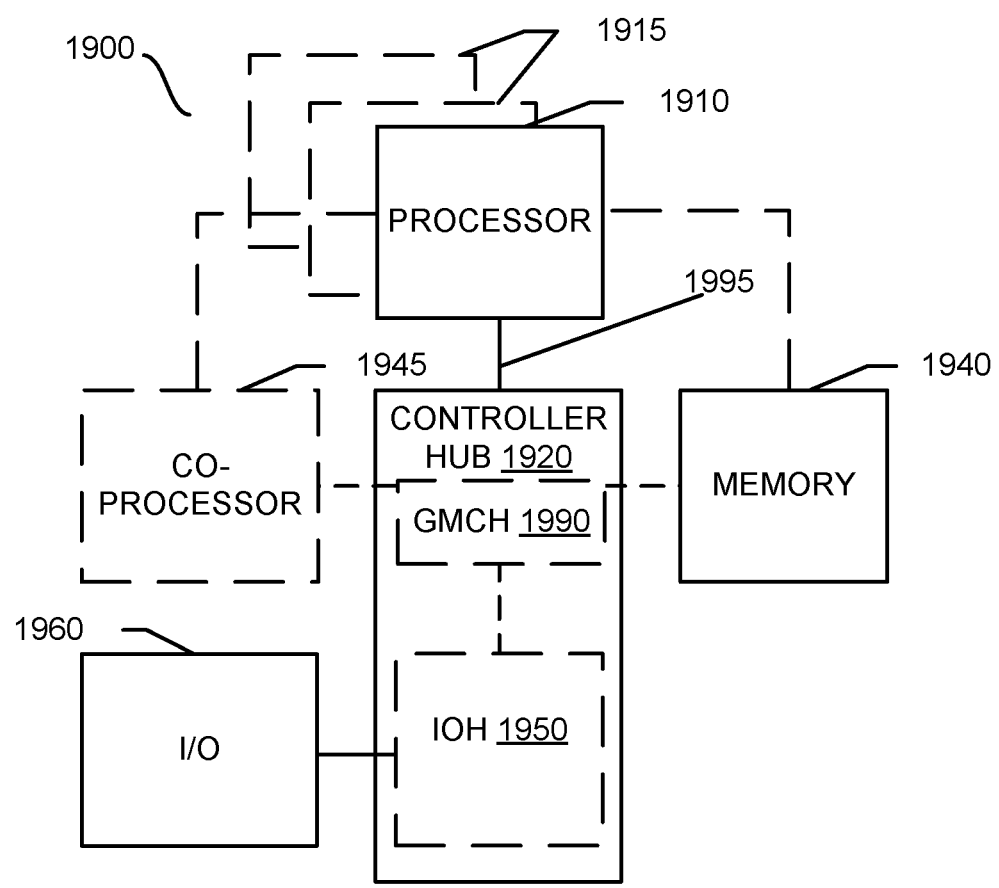
FIGS. 19-22 are block diagrams of exemplary computer architectures.

Referring now to FIG. 19, shown is a block diagram of a system 1900 in accordance with one embodiment of the present invention. The system 1900 may include one or more processors 1910, 1915, which are coupled to a controller hub 1920. In one embodiment, the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
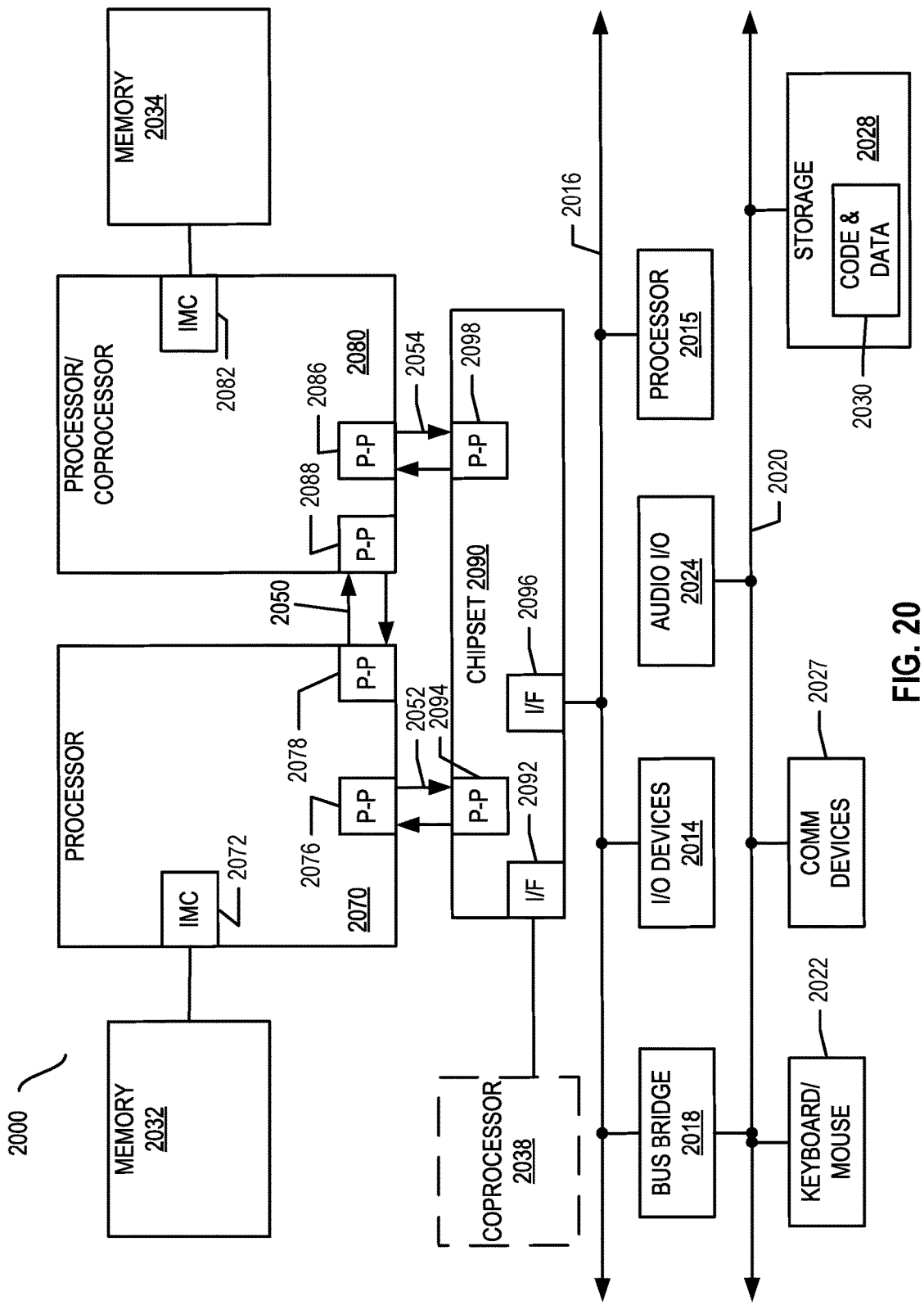

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2092. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
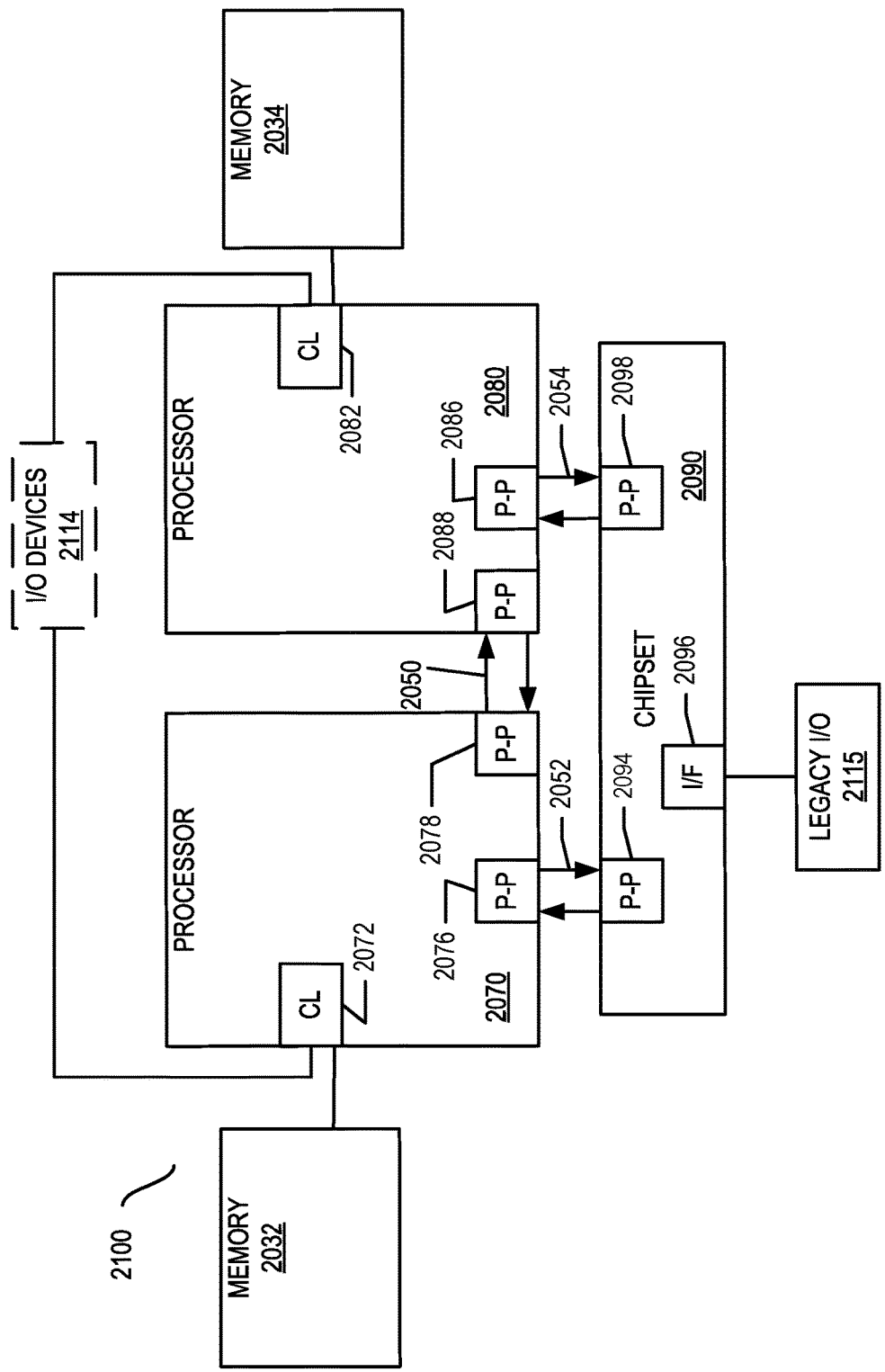

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
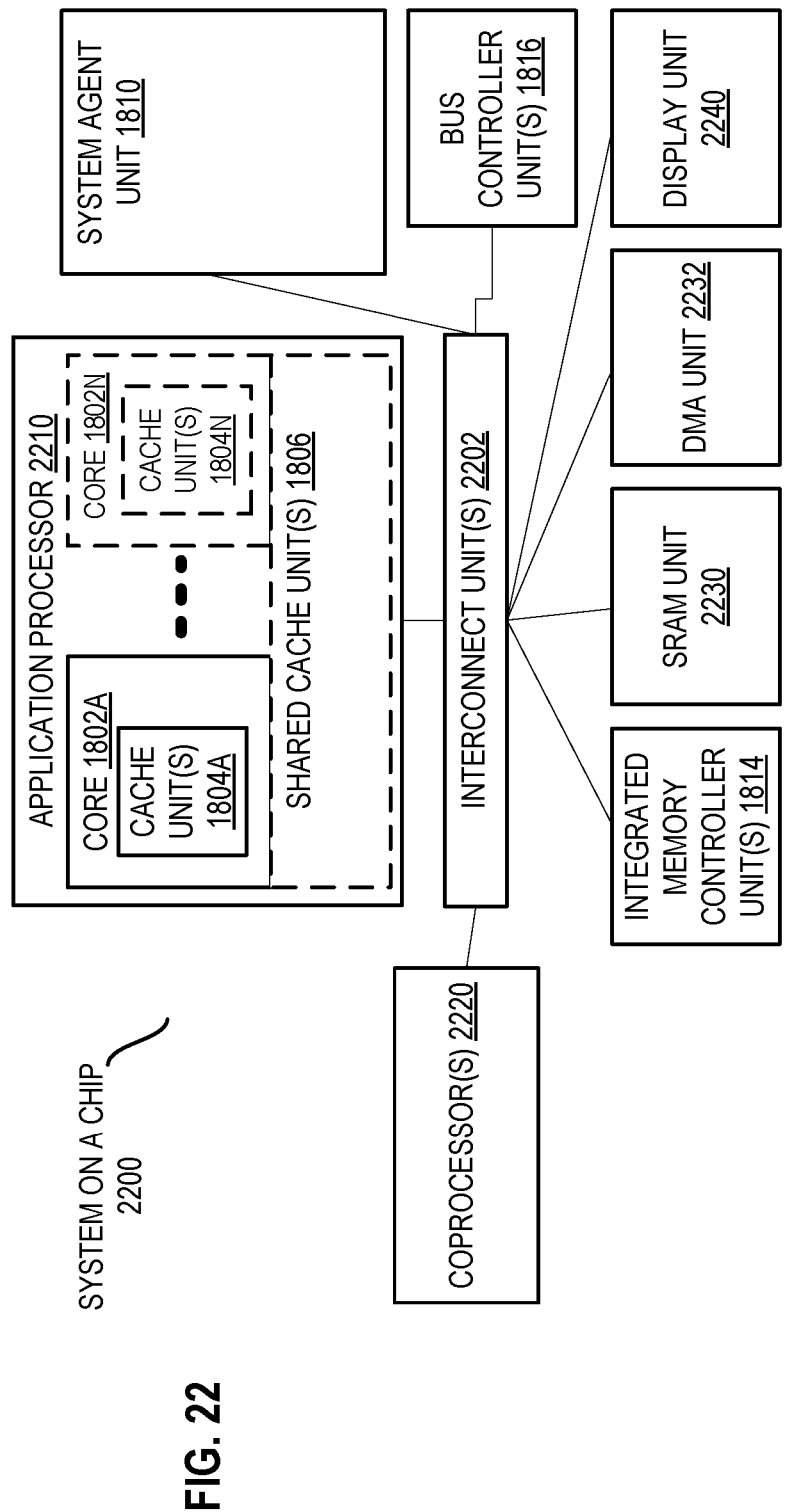

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 1802A-N, which include cache units 1804A-N, and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

EXAMPLES

Example 1 is a processor core. The processor core includes a decode circuit to decode an instruction, where the instruction specifies an address to be monitored. The processor core further includes a monitor circuit, where the monitor circuit includes a data structure to store a plurality of entries for addresses that are being monitored by the monitor circuit and a triggered queue, where the monitor circuit is to enqueue an address being monitored by the monitor circuit into the triggered queue in response to a determination that a triggering event for the address being monitored by the monitor circuit occurred. The processor core further includes an execution circuit to execute the decoded instruction to add an entry for the specified address to be monitored into the data structure and ensure, using a cache coherence protocol, that a coherency status of a cache line corresponding to the specified address to be monitored is in a shared state.

Example 2 includes the substance of example 1. In this example, the execution circuit is to return an indication that the specified address to be monitored is already being monitored by the monitor circuit in response to a determination that the entry for the specified address to be monitored exists in the data structure.

Example 3 includes the substance of example 1. In this example, the execution circuit is to return an indication that the data structure is full in response to a determination that there is no free entry available in the data structure.

Example 4 includes the substance of example 1. In this example, the monitor circuit is to free the entry for the specified address to be monitored in response to the determination that the triggering event for the specified address to be monitored occurred.

Example 5 includes the substance of example 1. In this example, the monitor circuit includes an overflow indicator and the monitor circuit is to set the overflow indicator in response to a determination that the triggered queue has overflowed.

Example 6 includes the substance of example 1. In this example, the monitor circuit is to determine that a triggering event for the specified address being monitored occurred based on a determination that that the coherency status of the cache line corresponding to the specified address to be monitored has changed.

Example 7 includes the substance of example 1. In this example, the entry for the specified address to be monitored includes an indication of a logical address corresponding to the specified address to be monitored and an indication of a physical address corresponding to the specified address to be monitored.

Example 8 is a method performed by a processor core. The method includes decoding an instruction, where the instruction specifies an address to be monitored and executing the decoded instruction to add an entry for the specified address to be monitored into a data structure of a monitor circuit and ensure, using a cache coherence protocol, that a coherency status of a cache line corresponding to the specified address to be monitored is in a shared state, where the monitor circuit is to enqueue the specified address to be monitored into a triggered queue of the monitor circuit in response to a determination that a triggering event for the specified address to be monitored occurred.

Example 9 includes the substance of example 8. In this example, the execution is to return an indication that the specified address to be monitored is already being monitored by the monitor circuit in response to a determination that the entry for the specified address to be monitored exists in the data structure.

Example 10 includes the substance of example 8. In this example, the execution is to return an indication that the data structure is full in response to a determination that there is no free entry available in the data structure.

Example 11 includes the substance of example 8. In this example, the monitor circuit is to free the entry for the specified address to be monitored in response to the determination that the triggering event for the specified address to be monitored occurred.

Example 12 includes the substance of example 8. In this example, the monitor circuit includes an overflow indicator, and the monitor circuit is to set the overflow indicator in response to a determination that the triggered queue has overflowed.

Example 13 includes the substance of example 8. In this example, the monitor circuit is to determine that a triggering event for the specified address being monitored occurred based on a determination that that the coherency status of the cache line corresponding to the specified address to be monitored has changed.

Example 14 includes the substance of example 8. In this example, the entry for the specified address to be monitored includes an indication of a logical address corresponding to the specified address to be monitored and an indication of a physical address corresponding to the specified address to be monitored.

Example 15 is a non-transitory computer-readable storage medium having stored therein instructions. The instructions, when executed by a processor core, cause the processor core to decode the instruction, where the instruction specifies an address to be monitored and execute the decoded instruction to add an entry for the specified address to be monitored into a data structure of a monitor circuit and ensure, using a cache coherence protocol, that a coherency status of a cache line corresponding to the specified address to be monitored is in a shared state, where the monitor circuit is to enqueue the specified address to be monitored into a triggered queue of the monitor circuit in response to a determination that a triggering event for the specified address to be monitored occurred.

Example 16 includes the substance of example 15. In this example, the execution is to return an indication that the specified address to be monitored is already being monitored by the monitor circuit in response to a determination that the entry for the specified address to be monitored exists in the data structure.

Example 17 includes the substance of example 15. In this example, the execution is to return an indication that the data structure is full in response to a determination that there is no free entry available in the data structure.

Example 18 includes the substance of example 15. In this example, the monitor circuit is to free the entry for the specified address to be monitored in response to the determination that the triggering event for the specified address to be monitored occurred.

Example 19 includes the substance of example 15. In this example, the monitor circuit includes an overflow indicator, and the monitor circuit is to set the overflow indicator in response to a determination that the triggered queue has overflowed.

Example 20 includes the substance of example 16. In this example, the monitor circuit is to determine that a triggering event for the specified address being monitored occurred based on a determination that that the coherency status of the cache line corresponding to the specified address to be monitored has changed.

Example 21 includes the substance of example 15. In this example, the entry for the specified address to be monitored includes an indication of a logical address corresponding to the specified address to be monitored and an indication of a physical address corresponding to the specified address to be monitored.

Example 22 is a system. The system includes a decode circuit to decode an instruction, where the instruction specifies an address to be monitored. The system further includes a monitor circuit, where the monitor circuit includes a data structure to store a plurality of entries for addresses that are being monitored by the monitor circuit and a triggered queue, where the monitor circuit is to enqueue an address being monitored by the monitor circuit into the triggered queue in response to a determination that a triggering event for the address being monitored by the monitor circuit occurred. The system further includes an execution circuit to execute the decoded instruction to add an entry for the specified address to be monitored into the data structure and ensure, using a cache coherence protocol, that a coherency status of a cache line corresponding to the specified address to be monitored is in a shared state.

Example 23 includes the substance of example 22. In this example, the execution circuit is to return an indication that the specified address to be monitored is already being monitored by the monitor circuit in response to a determination that the entry for the specified address to be monitored exists in the data structure.

Example 24 includes the substance of example 22. In this example, the execution circuit is to return an indication that the data structure is full in response to a determination that there is no free entry available in the data structure.

Example 25 includes the substance of example 22. In this example, the monitor circuit is to free the entry for the specified address to be monitored in response to the determination that the triggering event for the specified address to be monitored occurred.

Example 26 includes the substance of example 22. In this example, the monitor circuit includes an overflow indicator and the monitor circuit is to set the overflow indicator in response to a determination that the triggered queue has overflowed.

Example 27 includes the substance of example 22. In this example, the monitor circuit is to determine that a triggering event for the specified address being monitored occurred based on a determination that that the coherency status of the cache line corresponding to the specified address to be monitored has changed.

Example 28 is a processor core. The processor core includes a decoding means to decode an instruction, where the instruction specifies an address to be monitored. The processor core further includes a monitoring means, where the monitoring means includes a data structure to store a plurality of entries for addresses that are being monitored by the monitoring means and a triggered queue, where the monitoring means is to enqueue an address being monitored by the monitoring means into the triggered queue in response to a determination that a triggering event for the address being monitored by the monitoring means occurred. The processor core further includes an executing means to execute the decoded instruction to add an entry for the specified address to be monitored into the data structure and ensure, using a cache coherence protocol, that a coherency status of a cache line corresponding to the specified address to be monitored is in a shared state.

Example 29 includes the substance of example 28. In this example, the entry for the specified address to be monitored includes an indication of a logical address corresponding to the specified address to be monitored and an indication of a physical address corresponding to the specified address to be monitored.

Example 30 is a processor core. The processor core includes a decode circuit to decode an instruction. The processor core further includes a monitor circuit, where the monitor circuit includes a data structure to store a plurality of entries for addresses that are being monitored by the monitor circuit and a triggered queue to store a plurality of addresses for which a triggering event occurred. The processor core further includes an execution circuit to execute the decoded instruction to dequeue an address from the triggered queue and return the dequeued address in response to a determination that the triggered queue is not empty.

Example 31 includes the substance of example 30. In this example, the execution circuit is to cause the processor core to enter an optimized state in response to a determination that the triggered queue is empty and to cause the processor core to exit the optimized state in response to a determination that a triggering event for an address being monitored by the monitor circuit occurred.

Example 32 includes the substance of example 30. In this example, the execution circuit is to return an indication that a triggering event for an address being monitored by the monitor circuit has not occurred in response to a determination that the triggered queue is empty.

Example 33 includes the substance of example 30. In this example, the monitor circuit includes an overflow indicator and the execution circuit is to return an indication that the triggered queue has overflowed in response to a determination that the overflow indicator is set and also reset the overflow indicator.

Example 34 includes the substance of example 30. In this example, the execution circuit is to return an indication that no addresses are being monitored by the monitor circuit in response to a determination that the triggered queue is empty and the data structure is empty.

Example 35 includes the substance of example 34. In this example, the execution circuit is to determine that the data structure is empty based on a determination that a content of the data structure indicates that no addresses are being monitored by the monitor circuit.

Example 36 includes the substance of example 30. In this example, the execution circuit is to store the dequeued address in a destination register.

Example 37 is a method performed by a processor core. The method includes decoding an instruction and executing the decoded instruction to dequeue an address from a triggered queue of a monitor circuit and return the dequeued address in response to a determination that the triggered queue is not empty, where the monitor circuit includes a data structure to store a plurality of entries for addresses that are being monitored by the monitor circuit and where the triggered queue to store a plurality of addresses for which a triggering event occurred.

Example 38 includes the substance of example 37. In this example, the execution is to cause the processor core to enter an optimized state in response to a determination that the triggered queue is empty and to cause the processor core to exit the optimized state in response to a determination that a triggering event for an address being monitored by the monitor circuit occurred.

Example 39 includes the substance of example 37. In this example, the execution is to return an indication that a triggering event for an address being monitored by the monitor circuit has not occurred in response to a determination that the triggered queue is empty.

Example 40 includes the substance of example 37. In this example, the monitor circuit includes an overflow indicator and the execution is to return an indication that the triggered queue has overflowed in response to a determination that the overflow indicator is set and reset the overflow indicator.

Example 41 includes the substance of example 37. In this example, the execution is to return an indication that no addresses are being monitored by the monitor circuit in response to a determination that the triggered queue is empty and the data structure is empty.

Example 42 includes the substance of example 41. In this example, the execution is to determine that the data structure is empty based on a determination that a content of the data structure indicates that no addresses are being monitored by the monitor circuit.

Example 43 includes the substance of example 37. In this example, the execution is to store the dequeued address in a destination register.

Example 44 is a non-transitory computer-readable storage medium having stored therein instructions. The instructions, when executed by a processor core, cause the processor core to decode the instruction and execute the decoded instruction to dequeue an address from a triggered queue of a monitor circuit and return the dequeued address in response to a determination that the triggered queue is not empty, where the monitor circuit includes a data structure to store a plurality of entries for addresses that are being monitored by the monitor circuit and where the triggered queue to store a plurality of addresses for which a triggering event occurred.

Example 45 includes the substance of example 44. In this example, the execution is to cause the processor core to enter an optimized state in response to a determination that the triggered queue is empty and to cause the processor core to exit the optimized state in response to a determination that a triggering event for an address being monitored by the monitor circuit occurred.

Example 46 includes the substance of example 44. In this example, the execution is to return an indication that a triggering event for an address being monitored by the monitor circuit has not occurred in response to a determination that the triggered queue is empty.

Example 47 includes the substance of example 44. In this example, the monitor circuit includes an overflow indicator and the execution is to return an indication that the triggered queue has overflowed in response to a determination that the overflow indicator is set and reset the overflow indicator.

Example 48 includes the substance of example 44. In this example, the execution is to return an indication that no addresses are being monitored by the monitor circuit in response to a determination that the triggered queue is empty and the data structure is empty.

Example 49 includes the substance of example 48. In this example, the execution is to determine that the data structure is empty based on a determination that a content of the data structure indicates that no addresses are being monitored by the monitor circuit.

Example 50 includes the substance of example 44. In this example, the execution is to store the dequeued address in a destination register.

Example 51 is a system. The system includes a decode circuit to decode an instruction. The system further includes a monitor circuit, where the monitor circuit includes a data structure to store a plurality of entries for addresses that are being monitored by the monitor circuit and a triggered queue to store a plurality of addresses for which a triggering event occurred. The system further includes an execution circuit to execute the decoded instruction to dequeue an address from the triggered queue and return the dequeued address in response to a determination that the triggered queue is not empty.

Example 52 includes the substance of example 51. In this example, the execution circuit is to cause a processor core to enter an optimized state in response to a determination that the triggered queue is empty and to cause the processor core to exit the optimized state in response to a determination that a triggering event for an address being monitored by the monitor circuit occurred.

Example 53 includes the substance of example 51. In this example, the execution circuit is to return an indication that a triggering event for an address being monitored by the monitor circuit has not occurred in response to a determination that the triggered queue is empty.

Example 54 includes the substance of example 51. In this example, the monitor circuit includes an overflow indicator and the execution circuit is to return an indication that the triggered queue has overflowed in response to a determination that the overflow indicator is set and also reset the overflow indicator.

Example 55 includes the substance of example 51. In this example, the execution circuit is to return an indication that no addresses are being monitored by the monitor circuit in response to a determination that the triggered queue is empty and the data structure is empty.

Example 56 includes the substance of example 55. In this example, the execution circuit is to determine that the data structure is empty based on a determination that a content of the data structure indicates that no addresses are being monitored by the monitor circuit.

Example 57 is a processor core. The processor core includes a decoding means to decode an instruction. The processor core further includes a monitoring means, where the monitoring means includes a data structure to store a plurality of entries for addresses that are being monitored by the monitoring means and a triggered queue to store a plurality of addresses for which a triggering event occurred. The processor core further includes an executing means to execute the decoded instruction to dequeue an address from the triggered queue and return the dequeued address in response to a determination that the triggered queue is not empty.

Example 58 includes the substance of example 57. In this example, the executing means is to store the dequeued address in a destination register.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A processor core comprising:
   a decode circuit to decode an instruction;
   a monitor circuit, wherein the monitor circuit includes a data structure to store a plurality of entries for addresses that are being monitored by the monitor circuit and a triggered queue to store a plurality of addresses for which a triggering event occurred; and
   an execution circuit to execute the decoded instruction to dequeue an address from the triggered queue and return the dequeued address in response to a determination by the execution circuit that the triggered queue is not empty and to immediately return an indication that a triggering event for an address being monitored by the monitor circuit has not occurred in response to a determination by the execution circuit that the triggered queue is empty.

2. The processor core of claim 1, wherein the monitor circuit includes an overflow indicator, and wherein the execution circuit is to return an indication that the triggered queue has overflowed in response to a determination by the execution circuit that the overflow indicator is set and the execution circuit is to reset the overflow indicator.

3. The processor core of claim 1, wherein the execution circuit is to return an indication that no addresses are being monitored by the monitor circuit in response to a determination by the execution circuit that the triggered queue is empty and the data structure is empty.

4. The processor core of claim 3, wherein the execution circuit is to determine that the data structure is empty based on a determination by the execution circuit that a content of the data structure indicates that no addresses are being monitored by the monitor circuit.

5. The processor core of claim 1, wherein the execution circuit is to store the dequeued address in a destination register.

6. A method performed by a processor core, comprising:
   decoding a first instruction and a second instruction, wherein the first instruction and the second instruction are the same instruction of an instruction set;
   executing the decoded first instruction to dequeue an address from a triggered queue of a monitor circuit and return the dequeued address in response to a determination that the triggered queue is not empty, wherein the monitor circuit includes a data structure to store a plurality of entries for addresses that are being monitored by the monitor circuit and wherein the triggered queue is to store a plurality of addresses for which a triggering event occurred; and
   executing the decoded second instruction to immediately return an indication that a triggering event for an address being monitored by the monitor circuit has not occurred in response to a determination by the processor core that the triggered queue is empty.

7. The method of claim 6, further comprising:
decoding a third instruction, wherein the third instruction is the same instruction of the instruction set as the first instruction and the second instruction; and
executing the decoded third instruction, wherein the monitor circuit includes an overflow indicator, and wherein the execution of the decoded third instruction is to return an indication that the triggered queue has overflowed in response to a determination that the overflow indicator is set and is to reset the overflow indicator.

8. The method of claim 6, further comprising:
decoding a third instruction, wherein the third instruction is the same instruction of the instruction set as the first instruction and the second instruction; and
executing the decoded third instruction, wherein the execution of the decoded third instruction is to return an indication that no addresses are being monitored by the monitor circuit in response to a determination that the triggered queue is empty and the data structure is empty.

9. The method of claim 8, wherein the determination that the data structure is empty is based on a determination that a content of the data structure indicates that no addresses are being monitored by the monitor circuit.

10. The method of claim 6, wherein the execution of the decoded first instruction is to store the dequeued address in a destination register.

11. A non-transitory computer-readable storage medium having stored therein instructions, which when executed by a processor core, causes the processor core to:
decode a first instruction and a second instruction, wherein the first instruction and the second instruction are the same instruction of an instruction set;
execute the decoded first instruction to dequeue an address from a triggered queue of a monitor circuit and return the dequeued address in response to a determination that the triggered queue is not empty, wherein the monitor circuit includes a data structure to store a plurality of entries for addresses that are being monitored by the monitor circuit and wherein the triggered queue is to store a plurality of addresses for which a triggering event occurred; and
execute the decoded second instruction to immediately return an indication that a triggering event for an address being monitored by the monitor circuit has not occurred in response to a determination by the processor core that the triggered queue is empty.

12. The non-transitory computer-readable storage medium of claim 11, wherein the instructions, when executed by the processor core, further cause the processor core to decode a third instruction and execute the decoded third instruction, wherein the third instruction is the same instruction of the instruction set as the first instruction and the second instruction, wherein the monitor circuit includes an overflow indicator, and wherein the execution of the decoded third instruction is to return an indication that the triggered queue has overflowed in response to a determination that the overflow indicator is set and is to reset the overflow indicator.

13. The non-transitory computer-readable storage medium of claim 11, wherein the instructions, when executed by the processor core, further cause the processor core to decode a third instruction and execute the decoded third instruction, wherein the third instruction is the same instruction of the instruction set as the first instruction and the second instruction, wherein the execution of the decoded third instruction is to return an indication that no addresses are being monitored by the monitor circuit in response to a determination that the triggered queue is empty and the data structure is empty.

14. The non-transitory computer-readable storage medium of claim 13, wherein the determination that the data structure is empty is based on a determination that a content of the data structure indicates that no addresses are being monitored by the monitor circuit.

15. The non-transitory computer-readable storage medium of claim 11, wherein the execution of the decoded first instruction is to store the dequeued address in a destination register.

* * * * *